(12) United States Patent
Murakami

(10) Patent No.: US 12,521,323 B2
(45) Date of Patent: Jan. 13, 2026

(54) HYDROXYAPATITE-SUPPORTING POROUS SILICA PARTICLES, METHOD FOR PRODUCING HYDROXYAPATITE-SUPPORTING POROUS SILICA PARTICLES, AND COMPOSITION COMPRISING HYDROXYAPATITE-SUPPORTING POROUS SILICA PARTICLES

(71) Applicant: AGC SI-TECH CO., LTD., Kitakyushu (JP)

(72) Inventor: Takeshi Murakami, Fukuoka (JP)

(73) Assignee: AGC SI-TECH CO., LTD., Kitakyushu (JP)

( * ) Notice: Subject to any disclaimer, the term of this patent is extended or adjusted under 35 U.S.C. 154(b) by 628 days.

(21) Appl. No.: 17/938,858

(22) Filed: Oct. 7, 2022

(65) Prior Publication Data
US 2023/0052900 A1    Feb. 16, 2023

Related U.S. Application Data

(63) Continuation of application No. PCT/JP2021/014806, filed on Apr. 7, 2021.

(30) Foreign Application Priority Data

Apr. 15, 2020 (JP) ................. 2020-073063

(51) Int. Cl.
| | |
|---|---|
| *A61K 8/02* | (2006.01) |
| *A61K 8/24* | (2006.01) |
| *A61K 8/25* | (2006.01) |
| *A61Q 11/00* | (2006.01) |
| *A61Q 19/00* | (2006.01) |
| *B01J 20/04* | (2006.01) |
| *B01J 20/10* | (2006.01) |
| *B01J 20/28* | (2006.01) |
| *B01J 20/30* | (2006.01) |
| *B01J 20/32* | (2006.01) |

(52) U.S. Cl.
CPC .............. *A61K 8/0279* (2013.01); *A61K 8/24* (2013.01); *A61K 8/25* (2013.01); *A61Q 11/00* (2013.01); *A61Q 19/00* (2013.01); *B01J 20/048* (2013.01); *B01J 20/103* (2013.01); *B01J 20/28004* (2013.01); *B01J 20/28019* (2013.01); *B01J 20/3085* (2013.01); *B01J 20/3204* (2013.01); *B01J 20/3236* (2013.01); *B01J 20/3293* (2013.01); *A61K 2800/412* (2013.01); *A61K 2800/621* (2013.01); *A61K 2800/651* (2013.01)

(58) Field of Classification Search
USPC ....................................... 424/401
See application file for complete search history.

(56) References Cited

U.S. PATENT DOCUMENTS

2017/0275196 A1    9/2017    Ahmed

FOREIGN PATENT DOCUMENTS

| CN | 103006701 A | 4/2013 |
|---|---|---|
| JP | 5-262622 A | 10/1993 |
| JP | 2013-129655 A | 7/2013 |

OTHER PUBLICATIONS

International Search Report issued Jul. 6, 2021 in PCT/JP2021/014806 filed Apr. 7, 2021, 3 pages.
Shang, Y. et al., "Synthesis of Spherical Phosphorus-Containing Mesoporous Silica for Improving their Reaction Behavior in Simulated Body Fluid", Key Engineering Materials, 2018, vol. 782, 6 pages.
Li Jie et al., "Sol-Gel Preparation of HAp-Coated Silica Macrospheres from Water Glass and Their Protein Adsorption", Key Engineering Materials, vol. 529-530, 2013, pp. 637-640, Online: Nov. 29, 2012.
Extended European Search Report issued Jun. 27, 2024, in corresponding European Patent Application No. 21787789.3, 10 pages.
Prokopowicz Magdalena et al., "Biphasic composite of calcium phosphate-based mesoporous silica as a novel bone drug delivery system", Drug Delivery and Translational Research, Springer, Germany, vol. 10, No. 2, 2020, pp. 455-470.

*Primary Examiner* — Walter E Webb
(74) *Attorney, Agent, or Firm* — Oblon, McClelland, Maier & Neustadt, L.L.P.

(57) ABSTRACT

The present invention relates to a hydroxyapatite-supporting porous silica particle, in which hydroxyapatite is supported on a surface a spherical porous silica particle and inner surfaces of pores of the spherical porous silica particle, and in which the hydroxyapatite-supporting porous silica particle has a circularity of 0.760 or larger, a method for producing the hydroxyapatite-supporting porous silica particles, and a composition containing the hydroxyapatite-supporting porous silica particle.

9 Claims, 3 Drawing Sheets

(a)

(b)

HYDROXYAPATITE-SUPPORTING POROUS SILICA PARTICLES, METHOD FOR PRODUCING HYDROXYAPATITE-SUPPORTING POROUS SILICA PARTICLES, AND COMPOSITION COMPRISING HYDROXYAPATITE-SUPPORTING POROUS SILICA PARTICLES

CROSS-REFERENCE TO RELATED APPLICATIONS

This is a continuation of International Application No. PCT/JP2021/014806 filed on Apr. 7, 2021, and claims priority from Japanese Patent Application No. 2020-073063 filed on Apr. 15, 2020, the entire content of which is incorporated herein by reference.

TECHNICAL FIELD

The present invention relates to a hydroxyapatite-supporting porous silica particle in which hydroxyapatite is supported on a porous silica particle, a method for producing the hydroxyapatite-supporting porous silica particle, and a composition containing the hydroxyapatite-supporting porous silica particles.

BACKGROUND ART

Particulate materials are being used as fillers etc. in various fields. For example, in the cosmetics field, spherical fine particle powder is mixed in a cosmetic material to improve the slipperiness and tactile property of the cosmetic material with respect to a skin, cover blemishes, freckles, pimples, etc. on a skin, improve or enhance the skin color or makeup effects, and attain other purposes.

Examples of materials of fine particle powder used in the cosmetic material include extenders such as talc, mica, kaolin, silica, calcium carbonate, and aluminum oxide, color pigments such as titanium oxide and zinc oxide, and synthetic resins such as urethane, silicon, nylon, acrylic, polystyrene, and polyethylene. Since inorganic materials such as extenders and color pigments are difficult to produce good tactile property when mixed in a powder cosmetic material such as foundation and a body powder, use of a fine particle powder including a synthetic resin instead is being studied.

For example, Patent document 1 proposes a cosmetic material containing a spherical polyurethane fine powder that has the average particle diameter of 30 μm or less. Patent document 1 states that a spherical polyurethane fine powder is high in elasticity, and a cosmetic material mixing the powder is high in coverage, adherability, adsorption, and mixability and is soft and smooth in feel when used on a skin.

CITATION LIST

Patent Literature

Patent document 1: JP-A-H5-262622

SUMMARY OF INVENTION

Technical Problem

Microplastic beads obtained by rendering a synthetic resin into fine particles are fine particles having properties that they are small in specific gravity, persistent, and hydrophobic. Thus, they are prone to be released to the environment without being removed thoroughly in sewage treatment facilities etc. and then eaten by marine creatures erroneously to cause bioconcentration. Furthermore, they are prone to adsorb hydrophobic harmful substances and hence to cause harmful substances to be taken in food chains. In recent years, influences of such microplastic beads on the natural environment have been concerned. In view of this, attempts to reduce the amount of generation of microplastic are being made worldwide and there is demand for particulate materials for replacing microplastic beads.

The present invention has been made in view of the above problems, and an object of the invention is to provide a novel particulate material that provides the urethane-particle-like-tactile sense, more specifically, a smooth and dry, slippery sense (powdery sense) by decreasing the dynamic friction coefficient when used on a skin, has smooth feel without roughness, and is environmentally friendly.

Solution to Problem

Having studied diligently, the present inventors have completed the invention by finding out that the above problems can be solved by causing spherical porous silica particles that are high in circularity to support hydroxyapatite.

The invention relates to the following configurations <1> to <10>.

<1> A hydroxyapatite-supporting porous silica particle, in which hydroxyapatite is supported on a surface of a spherical porous silica particle and inner surfaces of pores of the spherical porous silica particle, and in which the hydroxyapatite-supporting porous silica particle has a circularity of 0.760 or larger.

<2> The hydroxyapatite-supporting porous silica particle according to <1>, in which an amount of the supported hydroxyapatite is from 0.1 mass % to 80 mass % in the hydroxyapatite-supporting porous silica particle.

<3> The hydroxyapatite-supporting porous silica particle according to <1> or <2>, having a ratio ($C_{HAp}/C_{CeO2}$) of $C_{HAp}$ to $C_{CeO2}$ of 1.0 or smaller, in which the $C_{HAp}$ is a maximum count number in a range of $2\theta=31.5°$ to $32.5°$ corresponding to a (211) plane of the hydroxyapatite in an XRD pattern of the hydroxyapatite-supporting porous silica particle and the $C_{CeO2}$ is a maximum count number in a range of $2\theta=28.0°$ to $29.0°$ corresponding to a (111) plane of a cerium oxide in a separately measured XRD pattern of cerium oxide as an external standard.

<4> The hydroxyapatite-supporting porous silica particle according to any one of <1> to <3>, satisfying the following conditions (1)-(3), in which when a unidirectional maximum particle diameter in a cross section of the hydroxyapatite-supporting porous silica particle is radially divided into a first portion to a third portion of three equal parts in an cross sectional image of the hydroxyapatite-supporting porous silica particle observed by SEM-EDX, a point analysis is performed at three points that are selected arbitrarily from a range of a circle having, as a diameter, a diameter length of the second portion located at the center and at three points that are selected arbitrarily from a range of a circle having, as a diameter, a diameter length of the first or third portion:

(1) an average value of an intraparticle variation coefficient of a peak signal intensity of calcium to a peak signal intensity of silicon is from 0% to 50%;

(2) an average value of an intraparticle variation coefficient of a peak signal intensity of phosphorus to a peak signal intensity of silicon is from 0% to 50%; and (3) an average value of an intraparticle variation coefficient of a peak signal intensity of calcium to a peak signal intensity of phosphorus is from 0% to 50%.

<5> The hydroxyapatite-supporting porous silica particle according to any one of <1> to <4>, in which the hydroxyapatite-supporting porous silica particles have an average particle diameter $D_{50}$ in a volume basis cumulative particle size distribution of from 1 μm to 500 μm.

<6> The hydroxyapatite-supporting porous silica particle according to any one of <1> to <5>, having a pore volume of from 0.05 mL/g to 2.50 mL/g.

<7> The hydroxyapatite-supporting porous silica particle according to any one of <1> to <6>, in which the hydroxyapatite-supporting porous silica particles have an oleic acid adsorption amount of 60 mg/g or higher when 0.5 g of the hydroxyapatite-supporting porous silica particles are mixed with 5 g of an imitation sebum solution containing oleic acid at a concentration of 16 mass %.

<8> A method for producing the hydroxyapatite-supporting porous silica particles according to any one of <1> to <7>, in which hydroxyapatite is produced by bringing a calcium source and a phosphorus source into contact with spherical porous silica particles each having a circularity of 0.560 or higher.

<9> The method for producing the hydroxyapatite-supporting porous silica particles according to <8>, the method including: fixing calcium on the surfaces of the spherical porous silica particles and the inner surfaces of pores of the spherical porous silica particles by bringing a first solution containing the calcium source into contact with the spherical porous silica particles; and producing hydroxyapatite by reacting the calcium with phosphorus by bringing a second solution containing the phosphorus source into contact with the calcium-fixed spherical porous silica particles.

<10> A composition for a skin, a composition for an oral cavity, a composition for an adsorbent, or a medicine composition containing the hydroxyapatite-supporting porous silica particle according to any one of <1> to <7>.

Advantageous Effects of Invention

The invention can provide hydroxyapatite-supporting porous silica particle that provides the urethane-particle-like-tactile sense. Furthermore, they are advantageous in being environment-friendly because hydroxyapatite is a compound existing in nature as is understood from the fact that it is a main component of teeth and bones and silica is also a compound existing in nature. As such, they can be utilized suitably as a composition for a skin such as a cosmetic material, a composition for an oral cavity, a composition for an adsorbent, a medicine composition, etc.

DESCRIPTION OF EMBODIMENTS

Figure 1:
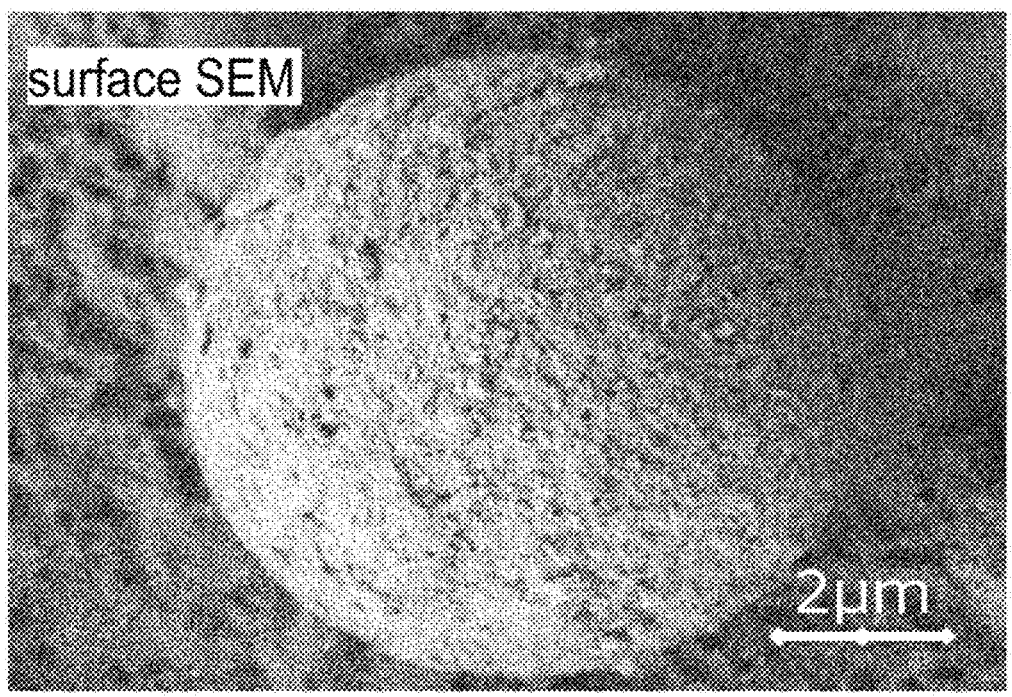
FIG. 1 includes scanning electron microscope images (SEM images) of a hydroxyapatite-supporting porous silica particle obtained in Example 1; (a) is a surface SEM image and (b) is a cross-sectional SEM image.
Figure 1:
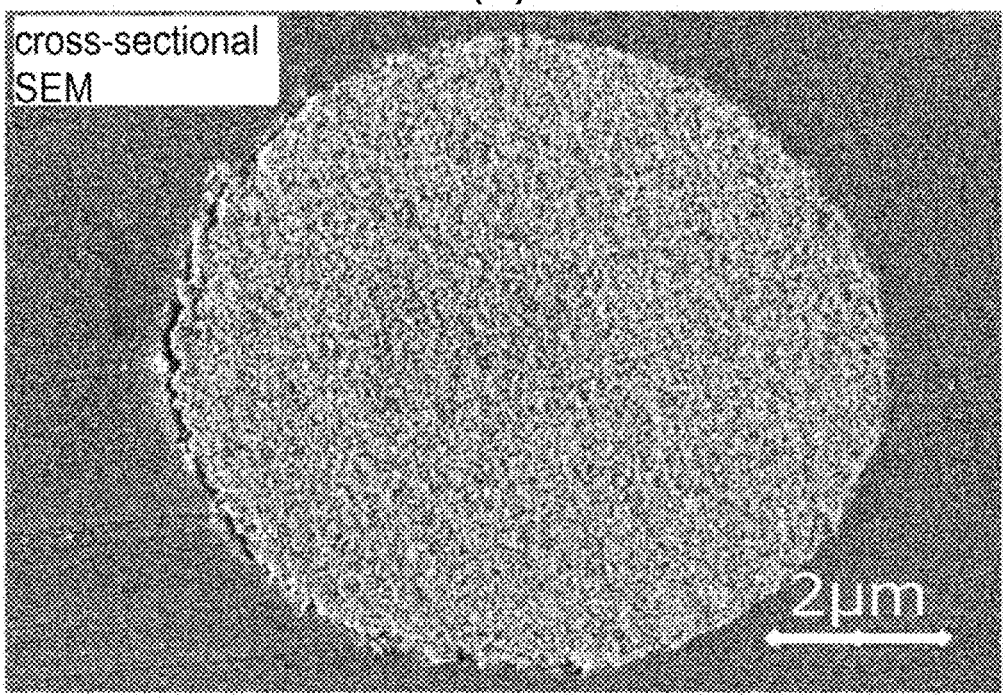

Although the present invention will be described below, the present invention is not limited to the examples in the following description.

It is noted that in this specification the term "mass" is equivalent to "weight."

Hydroxyapatite-Supporting Porous Silica Particle

A hydroxyapatite-supporting porous silica particle according to the present invention is such that hydroxyapatite is supported on the surface of a spherical porous silica particle and the inner surfaces of pores of the spherical porous silica particle, and the circularity thereof is 0.760 or larger.

In the present specification, the term "surface" of a spherical porous silica particle means a portion that defines the external shape of the spherical porous silica particle, that is, its outer surface. The term "inner surfaces of pores" of a spherical porous silica particle means portions that define pores of the spherical porous silica particle. The term "support" means a state that hydroxyapatite is adhered to or combined with the surface of the spherical porous silica particle and the inner surfaces of pores of the spherical porous silica particle. The term "circularity" represents the degree of unevenness of the surface of the hydroxyapatite-supporting porous silica particle, and it can be judged that the degree of unevenness of the particle surface is lower, that is, the particle is closer to a true sphere, as the circularity comes closer to 1.

Since the shape of the hydroxyapatite-supporting porous silica particle according to the present invention is a true sphere or close to a true sphere and hydroxyapatite is supported on the particle surface, improvements are made in a smooth and dry, slippery sense and a smooth feel when it is applied to a skin and it is higher in refractive index than silica itself. Furthermore, since hydroxyapatite is supported also on the inner surfaces of pores, the adsorption of free fatty acid such as oleic acid can be increased. Thus, in the case where it is contained in a cosmetic material, the cosmetic material becomes superior in feel, can prevent pores, blemishes, freckles, etc. from becoming conspicuous, and can suppress pimples by adsorbing free fatty acid that is secreted from sebum. That is, when used for a skin, the hydroxyapatite-supporting porous silica particle according to the present invention is high in soft focusing effect and is expected to have skin care performance. Furthermore, having silica as a base material, the hydroxyapatite-supporting porous silica particle according to the present invention is environment-conscious.

From the viewpoint of, for example, improving tactile sense, the circularity of the hydroxyapatite-supporting porous silica particle is 0.760 or higher, preferably 0.800 or higher, more preferably 0.820 or higher, further preferably 0.850 or higher, and particularly preferably 0.900 or higher. Although there are no particular limitations on the upper limit, the circularity being equal to 1 is most preferable.

Circularity can be calculated by examining an area and a perimeter of a particle with an image taken by a particle image analyzing instrument (e.g., "FPIA-3000S" (product name) produced by Sysmex Corporation) using image analysis software that is an attachment to the instrument and substituting them into the following equation:

circularity=(perimeter of a circle having the same projected area)/(perimeter of the particle), where perimeter of a circle having the same projected area: the length of the outline of a circle that is calculated as having the same area as an area of a shadow of a certain particle formed on a plane under it determined when the particle is observed from right above; and perimeter of the particle: a length of the outline of the shadow of the particle formed on the plane under it when the particle is observed from right above.

In the hydroxyapatite-supporting porous silica particle according to the present invention, it is preferable that the amount of supported hydroxyapatite in the hydroxyapatite-supporting porous silica particle be from 0.1 mass % to 80 mass %. In the case where the amount of supported hydroxyapatite is 0.1 mass % or larger, the tactile property of particles can be made close to that of urethane particles, thereby improving feel when particles adhered to a skin. In addition, the adsorption amount of free fatty acid can be increased. In the case where the amount of supported hydroxyapatite is 80 mass % or smaller, a sufficient oil absorption value of the hydroxyapatite-supporting porous silica particle can be secured. The amount of supported hydroxyapatite is more preferably 10 mass % or larger, further preferably 20 mass % or larger and particularly preferably 25 mass % or larger. On the other hand, the amount of supported hydroxyapatite is more preferably 50 mass % or smaller, further preferably 40 mass % or smaller and particularly preferably 35 mass % or smaller.

The amount of supported hydroxyapatite can be measured by high-frequency inductively coupled plasma atomic emission spectroscopy (ICP-AES) using an ICP emission analyzing instrument (e.g., "ICPE-9000" (product name) produced by Shimadzu Corporation).

In the present invention, hydroxyapatite is supported on the surface of the spherical porous silica particle and the inner surfaces of pores of the spherical porous silica particle. That is, hydroxyapatite is distributed on the surface of the spherical porous silica particle and inside it. It is preferable that hydroxyapatite be distributed approximately uniformly on the surface of a particle and the inner surfaces of pores. It is noted that in the present specification the expression "distributed approximately uniformly" means hydroxyapatite is distributed on the surface of a spherical silica particle and the inner surfaces of pores of a spherical porous silica particle almost uniformly without being localized in partial portions.

The fact that hydroxyapatite is supported on the surface of a spherical porous silica particle can be confirmed from a surface SEM image taken by a SEM (Scanning Electron Microscope).

In addition, the fact that hydroxyapatite is supported on the inner surfaces of pores of a spherical porous silica particle can be confirmed from a cross-sectional SEM image taken using a SEM and a cross-sectional EDX image (SEM-EDX) taken using EDX (Energy Dispersive X-ray Spectroscopy).

In the present invention, it is preferable to satisfy the following conditions (1)-(3), in which when a unidirectional maximum particle diameter in a cross section of the hydroxyapatite-supporting porous silica particle is radially divided into a first portion to a third portion of three equal parts in an cross sectional image of the hydroxyapatite-supporting porous silica particle observed by SEM-EDX, a point analysis is performed at three points that are selected arbitrarily from a range of a circle having, as a diameter, a diameter length of the second portion located at the center and at three points that are selected arbitrarily from a range of a circle having, as a diameter, a diameter length of the first or third portion:

(1) an average value (an average value of an intraparticle variation coefficient of Ca/Si) of an intraparticle variation coefficient of a peak signal intensity of calcium to a peak signal intensity of silicon is from 0% to 50%;

(2) an average value (an average value of an intraparticle variation coefficient of P/Si) of an intraparticle variation coefficient of a peak signal intensity of phosphorus to a peak signal intensity of silicon is from 0% to 50%; and (3) an average value (an average value of an intraparticle variation coefficient of Ca/P) of an intraparticle variation coefficient of a peak signal intensity of calcium to a peak signal intensity of phosphorus is from 0% to 50%.

In the case where results of point analyses performed at six points in prescribed regions that are obtained when a cross section of the hydroxyapatite-supporting porous silica particle is observed using SEM-EDX satisfy the above conditions (1)-(3), it is seen that hydroxyapatite is supported on the surfaces of pores located inside a particle and hydroxyapatite is supported so as to be distributed almost uniformly.

The average value of the intraparticle variation coefficient of Ca/Si is more preferably 40% or smaller, further preferably 30% or smaller and particularly preferably 20% or smaller. On the other hand, since the uniformity of hydroxyapatite in the particle becomes higher as the average value of the intraparticle variation coefficient becomes smaller, it is preferable that the lower limit that can be taken by the average value of the intraparticle variation coefficient of Ca/Si be 0%.

The average value of the intraparticle variation coefficient of P/Si is more preferably 40% or smaller, further preferably 30% or smaller and particularly preferably 25% or smaller. On the other hand, it is preferable that the lower limit that can be taken by the average value of the intraparticle variation coefficient of P/Si be 0%.

The average value of the intraparticle variation coefficient of Ca/P is more preferably 40% or smaller, further preferably 30% or smaller and particularly preferably 25% or smaller. On the other hand, it is preferable that the lower limit that can be taken by the average value of the intraparticle variation coefficient of Ca/P be 0%.

Furthermore, in the case where it is confirmed from a cross-sectional SEM image that a silica porous framework structure is formed inside the particle and it is found that phosphorus and calcium exhibit distribution states similar to a distribution state of silica when the cross-sectional EDX image is observed, it is seen visually and qualitatively that hydroxyapatite is supported on the surfaces of pores located inside the particle and hydroxyapatite is supported so as to be distributed almost uniformly.

Still further, in the present embodiment, it is preferable that variation coefficient (interparticle variation coefficient) of intraparticle average values of peak signal intensities of each of silicon, phosphorus, and calcium of hydroxyapatite-supporting porous silica particles be small.

That is, as above mentioned, it is preferable to satisfy the following conditions (4)-(6), in which when a unidirectional maximum particle diameter in a cross section of the hydroxyapatite-supporting porous silica particle is radially divided into a first portion to a third portion of three equal parts in an cross sectional image of the hydroxyapatite-supporting porous silica particle observed by SEM-EDX, a point analysis is performed at three points that are selected arbitrarily from a range of a circle having, as a diameter, a diameter length of the second portion located at the center and at three points that are selected arbitrarily from a range of a circle having, as a diameter, a diameter length of the first or third portion:

(4) a variation coefficient (interparticle variation coefficient of Ca/Si) of intraparticle average value of peak signal intensity of calcium to a peak signal intensity of silicon is from 0% to 50%;

(5) a variation coefficient (interparticle variation coefficient of P/Si) of intraparticle average value of a peak signal intensity of phosphorus to a peak signal intensity of silicon is from 0% to 50%; and (6) a variation coefficient (interparticle variation coefficient of Ca/P) of intraparticle average value of a peak signal intensity of calcium to a peak signal intensity of phosphorus is from 0% to 50%.

The interparticle variation coefficient of Ca/Si is more preferably 45% or smaller, further preferably 40% or smaller. Since the uniformity of supported hydroxyapatite between particles becomes higher as the interparticle variation coefficient becomes smaller, it is preferable that the lower limit that can be taken by the interparticle variation coefficient of Ca/Si be 0%.

The interparticle variation coefficient of P/Si is more preferably 45% or smaller, further preferably 40% or smaller. On the other hand, it is preferable that the lower limit that can be taken by the interparticle variation coefficient of P/Si be 0%.

The interparticle variation coefficient of Ca/P is more preferably 40% or smaller, further preferably 35% or smaller, particularly preferably 30% or smaller. On the other hand, it is preferable that the lower limit that can be taken by the interparticle variation coefficient of Ca/P be 0%.

It is preferable that the pore volume of the hydroxyapatite-supporting porous silica particle according to the present invention be from 0.05 mL/g to 2.50 mL/g. In the case where the pore volume is smaller than 0.05 mL/g, there may occur a case that the sufficient functions as the porous material are difficult to exhibit. The strength of the particle can be kept high in the case where the pore volume is 2.50 mL/g or smaller. The pore volume of the hydroxyapatite-supporting porous silica particle is more preferably 0.10 mL/g or larger, further preferably 0.50 mL/g or larger and particularly preferably 0.80 mL/g or larger. On the other hand, the pore volume of the hydroxyapatite-supporting porous silica particle is more preferably 2.00 mL/g or smaller, further preferably 1.60 mL/g or smaller and particularly preferably 1.30 mL/g or smaller.

It is noted that the pore volume can be calculated according to a nitrogen adsorption method using a BJH method.

It is preferable that the specific surface area of the hydroxyapatite-supporting porous silica particle according to the present invention be from 10 $m^2/g$ to 800 $m^2/g$. In the case where the specific surface area is 10 $m^2/g$ or larger, hydroxyapatite can be supported satisfactorily. In the case where the specific surface area is larger than 800 $m^2/g$, it may become difficult to maintain sufficient particle strength. The specific surface area is more preferably 50 $m^2/g$ or larger, further preferably 100 $m^2/g$ or larger and particularly preferably 200 $m^2/g$ or larger. On the other hand, the specific surface area be 700 $m^2/g$ or smaller, further preferably 600 $m^2/g$ or smaller and particularly preferably 400 $m^2/g$ or smaller.

It is noted that a specific surface area can be calculated according to a nitrogen adsorption method using a BET method.

It is preferable that an average particle diameter (50% particle diameter, $D_{50}$) in a volume basis cumulative particle size distribution of the hydroxyapatite-supporting porous silica particles according to the present invention be from 1 μm to 500 μm. In the case where the average particle diameter ($D_{50}$) is 1 μm or larger, they are low in cohesiveness and hence a sufficient ability to be dispersed in a composition can be secured easily. In the case where the average particle diameter is 500 μm or smaller, feel is improved when they are mixed in a composition. The average particle diameter ($D_{50}$) is more preferably 2 μm or larger, further preferably 3 μm or larger. On the other hand, the average particle diameter is more preferably 300 μm or smaller, further preferably 100 μm or smaller and particularly preferably 15 μm or smaller.

Furthermore, it is preferable that the ratio ($D_{90}/D_{10}$) of a 90% particle diameter ($D_{90}$) to a 10% particle diameter ($D_{10}$) in the volume basis cumulative particle size distribution of the hydroxyapatite-supporting porous silica particles be from 1.0 to 7.0. In the case where the ratio ($D_{90}/D_{10}$) is in the above range, good feel can be obtained when they are adhered to a skin. The ratio ($D_{90}/D_{10}$) is more preferably 1.5 or larger, further preferably 2.0 or larger. On the other hand, the ratio ($D_{90}/D_{10}$) is more preferably 6.0 or smaller, further preferably 5.5 or smaller.

The average particle diameter ($D_{50}$) and the ratio ($D_{90}/D_{10}$) of the 90% particle diameter ($D_{90}$) to the 10% particle diameter ($D_{10}$) are ones measured by an electrical sensing zone method (Coulter counter method) according to JIS Z 8832 (2010).

It is preferable that the dynamic friction coefficient of the hydroxyapatite-supporting porous silica particle according to the present invention be 0.75 or smaller. In the case where the dynamic friction coefficient is 0.75 or smaller, particles slide with a low resistance and a better feel is obtained when they come into contact with a skin, thereby exhibiting a smooth and dry, slippery sense. The dynamic friction coefficient is more preferably 0.60 or smaller, further preferably 0.50 or smaller and particularly preferably 0.40 or smaller. Although there are no particular limitations on the lower limit of the dynamic friction coefficient, the dynamic friction coefficient is preferably 0.05 or larger, more preferably 0.10 or larger and further preferably 0.15 or larger.

Furthermore, it is preferable that the standard deviation of the dynamic friction coefficients of the hydroxyapatite-supporting porous silica particles be smaller than 0.045. In the case where the standard deviation of the dynamic friction coefficients is smaller than 0.045, particles slide with a uniform resistance and improvements are made in a feel that they produce when brought onto contact with a skin, thereby exhibiting a smooth and dry, slippery sense. The standard deviation of the dynamic friction coefficients is more preferably 0.040 or smaller, further preferably 0.035 or smaller and particularly preferably 0.030 or smaller. Although there are no particular limitations on the lower limit of the standard deviation of the dynamic friction coefficients, the standard deviation of the dynamic friction coefficients is more preferably 0.001 or larger, further preferably 0.005 or larger and particularly preferably 0.008 or larger.

The dynamic friction coefficient and the standard deviation of the dynamic friction coefficients can be measured using a static/dynamic friction measuring instrument (e.g., "TL201Ts" (product name) produced by Trinity-Lab. Inc.). More specifically, a urethane artificial finger and an artificial leather piece are used as a contactor and a coating target substrate, respectively, the hydroxyapatite-supporting porous silica particles are applied to the artificial leather piece so that their sticking amount in terms of a bulk volume per unit area becomes 0.03 μL/mm$^2$, friction coefficients are measured by causing the measuring instrument to operate with a load of 30 gf and a scanning distance of 40 mm, and an average value in a range of from 300 msec to 4,000 msec is employed as a dynamic friction coefficient. And a standard deviation obtained in the above range is employed as a standard deviation of dynamic friction coefficients.

It is preferable that the static friction coefficient of the hydroxyapatite-supporting porous silica particles according to the present invention be 0.75 or smaller. In the case where the static friction coefficient is 0.75 or smaller, particles start to slide at a low resistance, which improve a feel that they produce when brought onto contact with a skin. The static friction coefficient is more preferably 0.70 or smaller, further preferably 0.60 or smaller and particularly preferably 0.50 or smaller. Although there are no particular limitations on the lower limit of the static friction coefficient, the static friction coefficient is more preferably 0.01 or larger, further preferably 0.05 or larger and particularly preferably 0.10 or larger.

The static friction coefficient can be measured by the above-mentioned static/dynamic friction measuring instrument. More specifically, friction coefficients are measured by the same method as described above and a maximum value in a range of from 0 msec to 300 msec is employed as a static friction coefficient.

It is preferable that the oil absorption value of the hydroxyapatite-supporting porous silica particles according to the present invention be from 20 mL/100 g to 500 mL/100 g. The functions of porous particles are difficult to exhibit sufficiently in the case where the oil absorption value is smaller than 20 mL/100 g, and it may become impossible to maintain sufficient particle strength in the case where the oil absorption value is larger than 500 mL/100 g. The oil absorption value is more preferably 50 mL/100 g or larger, further preferably 100 mL/100 g or larger. On the other hand, the oil absorption value is more preferably 400 mL/100 g or smaller, further preferably 350 mL/100 g or smaller and particularly preferably 250 mL/100 g or smaller.

The oil absorption value can be measured according to JIS K 5101-13-1 (2004).

It is preferable that the oleic acid adsorption amount of the hydroxyapatite-supporting porous silica particles according to the present invention when 0.5 g of the hydroxyapatite-supporting porous silica particles are mixed with 5 g of an imitation sebum solution containing oleic acid at a concentration of 16 mass % be 60 mg/g or higher. In the case where the oleic acid adsorption amount is 60 mg/g or higher, under the above conditions, oleic acid that is secreted from a skin is sufficiently adsorbed when the hydroxyapatite-supporting porous silica particles are contained in a cosmetic material and hence inflammation of pores or dyskeratosis due to secretion of oleic acid can be suppressed, thereby suppressing pore perceptibility. The oleic acid adsorption amount under the above conditions is more preferably 70 mg/g or higher, further preferably 100 mg/g or higher and particularly preferably 150 mg/g or higher. Although there are no particular limitations on the upper limit, from the viewpoint of manufacturing cost, the oleic acid adsorption amount is preferably 1,000 mg/g or smaller, more preferably 900 mg/g or smaller and further preferably 850 mg/g or smaller.

Furthermore, the oleic acid adsorption amount of the hydroxyapatite-supporting porous silica particles according to the present invention when 0.5 g of the hydroxyapatite-supporting porous silica particles mixed with 5 g of an imitation sebum solution containing oleic acid at a concentration of 0.1 mass % is preferably from 5.0 mg/g to 100 mg/g, more preferably from 7.5 mg/g to 50 mg/g and further preferably from 10 mg/g to 20 mg/g.

Still further, the oleic acid adsorption amount of the hydroxyapatite-supporting porous silica particles according to the present invention when 0.5 g of the hydroxyapatite-supporting porous silica particles are mixed with 5 g of an imitation sebum solution containing oleic acid at a concentration of 1 mass % is preferably from 30 mg/g to 300 mg/g, more preferably from 40 mg/g to 200 mg/g and further preferably from 70 mg/g to 100 mg/g.

Moreover, the oleic acid adsorption amount of the hydroxyapatite-supporting porous silica particles according to the present invention when 0.5 g of the hydroxyapatite-supporting porous silica particles are mixed with 5 g of an imitation sebum solution containing oleic acid at a concentration of 50 mass % is preferably from 70 mg/g to 900 mg/g, more preferably from 80 mg/g to 700 mg/g and further preferably from 200 mg/g to 600 mg/g.

It is noted that an oleic acid adsorption amount can be determined by converting a result of an acid value measurement using an ethanolic potassium hydroxide solution.

More specifically, first, 5 g of an imitation sebum solution containing oleic acid at a prescribed concentration and 0.5 g of the hydroxyapatite-supporting porous silica particles as a sample are mixed with each other. After a mixed liquid is stirred for 48 hours, it is centrifuged at 1,260 G (relative centrifugal acceleration, xg) for 10 minutes and 2.5 g of a supernatant is obtained. 25 mL of an organic solvent having ethanol:THF=1:2 and a proper amount of ethanolic phenolphthalein are added to this supernatant, and a resulting solution is made a titration target. 200 mmol/L of an ethanolic potassium hydroxide solution whose titer was determined in advance is used as a titration liquid, and a time point when it turns reddish purple is employed as an end point. The titer of the titration liquid is determined in advance from an amount that is required for neutralization of 200 mmol/L of hydrochloric acid. An oleic acid adsorption amount is determined according to the following Expression (1). It is noted that a test that is conducted according to the above procedure using only an imitation sebum solution without mixing the hydroxyapatite-supporting porous silica particles in it is employed as a comparison test.

[Formula 1]

$$\text{Oleic acid adsorption amount (mg/g)} = \text{acid value reduction (mg/g)} \times \frac{\text{oleic acid molecular weight (g/mol)}}{\text{potassium hydroxide molecular weight (g/mol)}} \times \frac{\text{imitation sebum solution weight (g)}}{\text{sample weight (g)}} \quad (1)$$

In the above Expression (1), the acid value reduction (mg/g) is determined in the following manner:

[Formula 2]

$$\text{Acid value reduction (mg/g)} = \text{acid value of comparison test (mg/g)} - \text{acid value of each test (mg/g)}$$

$$\text{Acid value (mg/g)} = \frac{\text{titration volume (mL)} \times \text{titer (-)} \times (200 \times 10^{-3})\,(\text{mol/L}) \times \text{potassium hydroxide molecular weight (g/mol)}}{\text{supernatant weight (g)}}$$

In the present invention, the oleic acid adsorption amount can be adjusted by adjusting the amount of supported hydroxyapatite.

In the hydroxyapatite-supporting porous silica particle according to the present invention, it is preferable that the ratio ($C_{HAp}/C_{CeO2}$) of $C_{HAp}$ to $C_{CeO2}$ be 1.0 or smaller, in which the $C_{HAp}$ is a maximum count number in a range of $2\theta=31.5°$ to $32.5°$ corresponding to the (211) plane of the hydroxyapatite in an XRD pattern of the hydroxyapatite-supporting porous silica particle and the $C_{CeO2}$ is a maximum count number in a range of $2\theta=28.0°$ to $29.0°$ corresponding to the (111) plane of the cerium oxide in a separately measured XRD pattern of cerium oxide as an external standard. The ratio $C_{HAp}/C_{CeO2}$ represents the crystallinity of the supported hydroxyapatite, and in the case where the ratio $C_{HAp}/C_{CeO2}$ is 1.0 or smaller, a large oleic acid adsorption amount is expected. $C_{HAp}/C_{CeO2}$ is preferably 1.0 or smaller, more preferably 0.75 or smaller and further preferably 0.50 or smaller. Although there are no particular limitations on the lower limit of $C_{HAp}/C_{CeO2}$, $C_{HAp}/C_{CeO2}$ is preferably 0.05 or larger, more preferably 0.10 or larger and further preferably 0.15 or larger.

For example, an XRD pattern can be measured using "D2 PHASER" (product name) produced by Bruker Corporation.

In the hydroxyapatite-supporting porous silica particles according to the present invention, the haze of a 5 mass % dispersion of an imitation sebum solution in which the oleic acid concentration is 16 mass % is preferably from 1% to 40%. In the case where the haze of the dispersion is 1% or more, the soft focusing effect becomes high when they are contained in a cosmetic material, thereby obtaining the effect of shielding blemishes, freckles, etc. In the case where the haze of the dispersion is larger than 40%, when they are used in a cosmetic material a skin is prone to look white unnaturally like a white pigment does. The haze is more preferably 5% or larger, further preferably 10% or larger. On the other hand, the haze is more preferably 35% or smaller, further preferably 30% or smaller.

The haze can be measured using a haze meter (e.g., "NDH-7000" (product name) produced by Nippon Denshoku Industries Co., Ltd.).

In the hydroxyapatite-supporting porous silica particles according to the present invention, it is preferable that a PSF (Point Spread Function) half width be from 1.2 μm to 2.4 μm. The PSF half width is an index indicating the degree of refraction of particles; it can be said that particles are high in refractivity in the case where this value is large. In the case where the PSF half width is 1.2 μm or larger, the hydroxyapatite-supporting porous silica particles are high in refractivity and are superior in soft focusing effect when used in a cosmetic material. In the case where the PSF half width is larger than 2.4 μm, a skin is prone to look white unnaturally like a white pigment does when they are used in a cosmetic material. The PSF half width is more preferably 1.4 μm or larger. On the other hand, the PSF half width is more preferably 2.0 μm or smaller.

The PSF half width is determined in the following manner. A measurement sample is produced by sandwiching a dispersion between quartz plates in such a manner that no air bubbles go into it, the dispersion being obtained by mixing 0.02 g of the hydroxyapatite-supporting porous silica particles and 0.38 g of an imitation sebum solution containing oleic acid at a concentration of 16 mass % and dispersing them. The measurement sample is put on a glass plate, a digital camera is set so as to be distant from the surface of the measurement sample by 3.0 cm, an ISO resolution test chart No. 2 is set as a background so as to be distant from the back surface of the measurement sample by 1.0 cm, and an image is obtained by shooting the background via the measurement sample. A PSF (point spread function) image is obtained by performing blind deconvolution on this image using image analysis software (e.g., "AutoQuantX3" (product name) produced by Media Cybernetics, Inc.). A line profile is acquired along a 45° slant line that passes the center of the thus-obtained PSF image and its half width is employed as a PSF half width.

It is noted that in the present invention the imitation sebum solution contains caprylic/capric triglyceride (A), octyldodecyl myristate (B), squalane (C), and oleic acid (D), the components A, B, and C are contained so that the mass ratio of A:B:C is about 43:29:12, and the component D is contained at a prescribed concentration.

Method for Producing the Hydroxyapatite-Supporting Porous Silica Particles

Next, a method for producing the hydroxyapatite-supporting porous silica particles according to the present invention will be described.

To produce the hydroxyapatite-supporting porous silica particles according to the present invention, hydroxyapatite is produced by bringing a calcium source and a phosphorus source into contact with spherical porous silica particles each having a circularity of 0.560 or higher. The method according to the present invention allows the hydroxyapatite to be supported on the surface of the spherical porous silica particle and the inner surfaces of pores of the spherical porous silica particle in such a manner as to cause almost no change in the shape of the spherical porous silica particle which is a base material.

It is preferable that the method for producing the hydroxyapatite-supporting porous silica particles according to the present invention include the following steps (I) and (II):

(I) Fixing calcium on the surfaces of the spherical porous silica particles and the inner surfaces of pores of spherical porous silica particles by bringing a first solution containing the calcium source into contact with the spherical porous silica particles (first step); and (II) Producing hydroxyapatite by reacting the calcium with phosphorus by bringing a second solution containing the phosphorus source into contact with the calcium-fixed spherical porous silica particles (second step).

<(I) First step>

The spherical porous silica particle is a secondary particle in which continuous minute holes like a network are formed by aggregation of silicon dioxide primary particles, and the spherical porous silica particle used in the producing method according to the present invention has the circularity of 0.560 or higher.

In the case where the circularity is 0.560 or higher, it becomes easy to make the circularity of the hydroxyapatite-supporting porous silica particle obtained 0.760 or higher. The circularity of the spherical porous silica particle is preferably 0.600 or higher, more preferably 0.700 or higher, further preferably 0.800 or higher, and particularly preferably 0.900 or higher. Although there are no particular limitations on the upper limit, the upper limit of the circularity is most preferably equal to 1.

It is preferable that the pore volume of the spherical porous silica particle be from 0.05 mL/g to 2.50 mL/g. In the case where the pore volume is smaller than 0.05 mL/g, there may occur a case that the sufficient functions as the porous material are difficult to exhibit. The strength of the particle can be kept high in the case where the pore volume is 2.50 mL/g or smaller. The pore volume of the spherical porous silica particle is more preferably 0.10 mL/g or larger, further preferably 0.70 mL/g or larger and particularly preferably 1.50 mL/g or larger. On the other hand, the pore volume of the spherical porous silica particle is more preferably 2.00 mL/g or smaller, further preferably 1.80 mL/g or smaller and particularly preferably 1.60 mL/g or smaller.

It is preferable that the specific surface area of the spherical porous silica particle be from 10 m$^2$/g to 1,000 m$^2$/g. In the case where the specific surface area is 10 m$^2$/g or larger, the hydroxyapatite can be supported satisfactorily. In the case where the specific surface area is larger than 1,000 m$^2$/g, there may occur a case that the strength of the particle cannot be kept sufficiently high. The specific surface area is more preferably 50 m$^2$/g or larger, further preferably 200 m$^2$/g or larger and particularly preferably 500 m$^2$/g or larger. On the other hand, the specific surface area is more preferably 900 m$^2$/g or smaller, particularly preferably 850 m$^2$/g or smaller.

It is preferable that an average particle diameter ($D_{50}$) in a volume basis cumulative particle size distribution of the spherical porous silica particles be from 1 μm to 500 μm. In the case where the average particle diameter ($D_{50}$) is 1 μm or larger, their cohesiveness is suppressed and sufficient dispersibility in a composition can be secured easily. In the case where the average particle diameter ($D_{50}$) is 500 μm or smaller, the feel that is obtained when they are mixed in a composition can be improved. The average particle diameter ($D_{50}$) is more preferably 2 μm or larger, further preferably 3 μm or larger. On the other hand, the average particle diameter ($D_{50}$) is more preferably 300 μm or smaller, further preferably 100 μm or smaller and particularly preferably 15 μm or smaller.

It is preferable that the ratio ($D_{90}/D_{10}$) of a 90% particle diameter ($D_{90}$) to a 10% particle diameter ($D_{10}$) in the volume basis cumulative particle size distribution of the spherical porous silica particles be from 1.0 to 5.0. In the case where the ratio $D_{90}/D_{10}$ is in the above range, a good feel can be obtained. The ratio ($D_{90}/D_{10}$) is more preferably 1.5 or larger, particularly preferably 2.0 or larger. On the other hand, the ratio ($D_{90}/D_{10}$) is more preferably 4.0 or smaller, further preferably 3.5 or smaller.

It is preferable that the oil absorption value of the spherical porous silica particle be from 20 mL/100 g to 500 mL/100 g. In the case where the oil absorption value is smaller than 20 mL/100 g, the functions as porous are difficult to exhibit sufficiently. In the case where the oil absorption value is larger than 500 mL/100 g, there may occur a case that sufficient particle strength cannot be maintained. The oil absorption value is more preferably 50 mL/100 g or larger, further preferably 200 mL/100 g. On the other hand, the oil absorption value is more preferably 450 mL/100 g or smaller, further preferably 350 mL/100 g or smaller.

Spherical porous silica particles on the market can be used, the examples of them include "H-52" (product name, circularity: 0.958, average particle diameter: 5.0 μm, specific surface area: 652 m$^2$/g, pore volume: 1.59 mL/g, average pore diameter: 9.8 nm, oil absorption value: 324 mL/100 g) produced by AGC Si-Tech Co., Ltd.

Examples of the calcium source that is used in producing hydroxyapatite-supporting porous silica particles include calcium hydroxide, calcium chloride, calcium oxide, calcium nitrate, calcium carbonate, calcium silicate, calcium acetate, calcium hypochlorite, calcium formate, calcium bicarbonate, and sodium calcium edetate. One kind of these examples may be used singly or two or more kinds of them may be used in combination. Among these examples, calcium hydroxide and calcium chloride are preferable from the viewpoint of suppressing environmental loads by byproducts.

In the first step, the first solution containing the calcium source is brought into contact with the spherical porous silica particles. Example solvents of the first solution include water, ethanol, and isopropyl alcohol. One kind among these examples may be used singly or two or more kinds among them may be used in combination. Among these examples, water is preferable from the viewpoint of suppressing environmental loads by sewage.

It is preferable that the concentration of the calcium source in the first solution be from 0.001 g/mL to 0.100 g/mL. In the case where the concentration is in the above range, calcium can be fixed uniformly on the surfaces of the spherical porous silica particles and the inner surfaces of pores of the spherical porous silica particles and, furthermore, the production efficiency is increased. The concentration of the calcium source in the first solution is more preferably 0.010 g/mL or higher, further preferably 0.020 g/mL or higher and particularly preferably 0.030 g/mL or higher. On the other hand, the concentration of the calcium source in the first solution is more preferably 0.090 g/mL or lower, further preferably 0.080 g/mL or lower and particularly preferably 0.070 g/mL or lower.

The first solution may contain other components within such ranges as not to obstruct adsorption of calcium. Examples of the other components include sodium hydroxide, potassium hydroxide, ammonia, and hydrochloric acid as pH adjusters.

There are no particular limitations on the method for bringing the first solution to the spherical porous silica particles; examples of that method include a method of immersing the spherical porous silica particles in the first solution, a method of dropping, spraying or coating the first solution onto the spherical porous silica particles. Among these example methods, from the viewpoints that the operation is simple and uniform contact is expected, the method of immersing the spherical porous silica particles in the first solution is preferable, and the method of immersing the spherical porous silica particles in the first solution while stirring the first solution is more preferable.

It is preferable that the use amount of the first solution to be brought into contact with the spherical porous silica particles be from 0.05 g to 50 g for 1 g of the spherical porous silica particles. In the case where the use amount of the first solution for 1 g of the spherical porous silica particles is 0.05 g or larger, calcium can be fixed uniformly on the surfaces of the spherical porous silica particles and the inner surfaces of pores of the spherical porous silica particles and, furthermore, the production efficiency is increased. In the case where the use amount of the first solution for 1 g of the spherical porous silica particles is 50 g or smaller, excessive use of the first solution can be prevented. The use amount of the first solution for 1 g of the spherical porous silica particles is more preferably 1g or larger, further preferably 3 g or larger and particularly preferably 5 g or larger. On the other hand, the use amount of the first solution for 1 g of the spherical porous silica particles is more preferably 30 g or smaller, further preferably 20 g or smaller and particularly preferably 10 g or smaller.

From the viewpoint of reactivity, it is preferable that the temperature at which the first solution is brought into contact with the spherical porous silica particles be 5° C. to 80° C. In the case where the temperature is in the above temperature range, the reaction proceeds promptly. The contact temperature is more preferably 10° C. or higher, further preferably 15° C. or higher and particularly preferably 20° C. or higher. On the other hand, the contact temperature is more preferably 80° C. or lower, further preferably 70° C. or lower and particularly preferably 60° C. or lower.

From the viewpoint of reactivity, it is preferable that the time for which the first solution is brought into contact with the spherical porous silica particles be 0.1 hours to 24 hours. In the case where contact is made for a time in the above range, the reaction proceeds sufficiently and calcium is fixed on the surfaces of the spherical porous silica particles and the inner surfaces of pores of the spherical porous silica particles. The reaction time is more preferably 1 hour or longer, particularly preferably 2 hours or longer. On the other hand, the reaction time is more preferably 18 hours or shorter, particularly preferably 12 hours or shorter.

After the reaction, it is preferable to collect the spherical porous silica particles with calcium fixed on the surfaces and the inner surfaces of pores by filtering, and clean and dry them.

There are no particular limitations on the filtering method; examples of filtering method include natural filtration, vacuum filtration, and centrifugal filtration.

There are no particular limitations on the cleaning method; cleaning may be performed until the calcium concentration in the filtrate becomes steady. Examples of cleaning liquid include water, ethanol, isopropyl alcohol, and among these it is preferable to use water.

The drying may be performed by natural drying or using a drying means such as a heater at, for example, from 50° C. to 300° C., preferably from 120° C. to 180° C., for from 1 hour to 24 hours, preferably from 12 hours to 18 hours.

<(II) Second step>

In the second step, a second solution containing a phosphorus source is brought into contact with the spherical porous silica particles with calcium fixed (hereinafter also referred to as "calcium-fixed porous silica particles) which is obtained in the first step.

Examples of the phosphorus source include phosphoric acid, triammonium phosphate, diammonium hydrogen phosphate, ammonium dihydrogen phosphate, trisodium phosphate, disodium hydrogen phosphate, sodium dihydrogen phosphate, tripotassium phosphate, dipotassium hydrogen phosphate, and potassium dihydrogen phosphate. One kind of these examples may be used singly or two or more kinds of them may be used in combination. Among these examples, phosphoric acid is preferable from the viewpoint of suppressing environmental loads by byproducts.

In the second step, the second solution containing the phosphorus source is brought into contact with the spherical porous silica particles. Examples of solvent of the second solution include water, ethanol, isopropyl alcohol. One kind among these examples may be used singly or two or more kinds among them may be used in combination. Among these examples, water is preferable from the viewpoint of suppressing environmental loads by sewage.

It is preferable that the concentration of the phosphorus source in the second solution be from 0.01 g/mL to 0.50 g/mL. In the case where the concentration is 0.01 g/mL or higher, the phosphorus source can react sufficiently with the calcium that is fixed on the surfaces of the spherical porous silica particles and the inner surfaces of pores of the spherical porous silica particles and, furthermore, the production efficiency is increased. In the case where the concentration of phosphoric acid is higher than 0.50 g/mL, the pH is small and hence a sufficient amount of supported hydroxyapatite may not be obtained because of dissolution of produced hydroxyapatite. The concentration of the phosphorus source in the second solution is more preferably 0.02 g/mL or higher, particularly preferably 0.03 g/mL or higher. On the other hand, the concentration of the phosphorus source in the second solution is more preferably 0.30 g/mL or lower, particularly preferably 0.20 g/mL or lower.

It is preferable that the pH of the second solution be from 5.0 to 12.0 because as mentioned above produced hydroxyapatite may dissolve when brought into contact with the second solution in the case where the concentration of phosphoric acid is too high. In the case where the pH of the second solution is in the above range, hydroxyapatite can be produced through reaction between calcium and phosphorus, and the produced hydroxyapatite does not dissolve. The pH after the contact with the second solution is more preferably 6.0 or larger, particularly preferably 7.0 or larger. On the other hand, the pH after the contact with the second solution is more preferably 11.0 or smaller, further preferably 10.0 or smaller and particularly preferably 9.0 or smaller.

The second solution may contain other components within such ranges as not to obstruct production of hydroxyapatite. Examples of the other components include sodium hydroxide, potassium hydroxide, ammonia, and hydrochloric acid which are pH adjusters.

There are no particular limitations on the method for bringing the second solution to the calcium-fixed porous silica particles and the same methods as exemplified in the first step can be employed. In addition, the second solution may be produced by adding the phosphorus source and, if necessary, other components to slurry in which the calcium-fixed porous silica particles obtained in the first step are dispersed in a solvent.

Among these methods, from the viewpoint that the operation is simple and uniform contact is expected, a method of immersing the calcium-fixed porous silica particles in a second solution produced by adding a phosphorus source to water slurry containing calcium-fixed porous silica particles is preferable. To suppress local pH reduction, it is more preferable to bring the second solution into contact with the calcium-fixed porous silica particles while stirring is being made.

It is preferable that the use amount of the second solution to be brought into contact with the calcium-fixed porous silica particles be from 0.05 g to 50 g for 1 g of the calcium-fixed porous silica particles. In the case where the use amount of the second solution for 1 g of the calcium-fixed porous silica particles is 0.05 g or larger, reaction can be made with most of the calcium fixed on the surfaces of the spherical porous silica particles and the inner surfaces of pores of the spherical porous silica particles. On the other hand, in the case where the use amount of the second solution for 1 g of the calcium-fixed porous silica particles is 50 g or smaller, use of an excessive amount of the second solution can be prevented. The use amount of the second solution is more preferably 1 g or larger, further preferably 3 g or larger and particularly preferably 5 g or larger. On the other hand, the use amount of the second solution is more preferably 30 g or smaller, further preferably 20 g or smaller and particularly preferably 10 g or smaller.

From the viewpoint of reactivity, it is preferable that the temperature at which the second solution is brought into contact with the calcium-fixed porous silica particles be from 5° C. to 80° C. In the case where the temperature is in the above range, the reaction proceeds promptly. The contact temperature is more preferably 10° C. or higher, further preferably 15° C. or higher and particularly preferably 20° C. or higher. On the other hand, the contact temperature is more preferably 80° C. or lower, further preferably 70° C. or lower and particularly preferably 60° C. or lower.

From the viewpoint of reactivity, it is preferable that the time for which the second solution is brought into contact with the calcium-fixed porous silica particles be from 0.1 hours to 24 hours. In the case where contact is made for a time in the above range, the reaction proceeds sufficiently and hydroxyapatite is produced on the surfaces of the spherical porous silica particles and the inner surfaces of pores of the spherical porous silica particles. The reaction time is more preferably 1 hour or longer, particularly preferably 2 hours or longer. On the other hand, the reaction time is more preferably 18 hours or shorter, particularly preferably 12 hours or shorter.

After the reaction, it is preferable to collect the hydroxyapatite-supporting porous silica particles according to the present invention in which hydroxyapatite is produced on surfaces and the inner surfaces of pores by filtering, and clean and dry them.

The same filtering method, cleaning method, and drying method as in the first step may be performed.

How hydroxyapatite is produced in the case that calcium hydroxide is used as the calcium source and phosphoric acid is used as the phosphorus source will be described below.

$$SiO^-+Ca^{2+} \rightarrow SiOCa^+ \quad \text{First step:}$$

$$SiOCa^++10H^+ \rightarrow 10SiOH+10Ca^{2+}$$

$$10Ca^{2+}+6PO_4^{3-}+2OH^-Ca_{10}(PO_4)_6(OH)_2 \quad \text{Second step:}$$

For example, the hydroxyapatite-supporting porous silica particles according to the present invention can be used suitably in a composition for use on a skin, a composition for an oral cavity, a composition for adsorbent, or a medicine composition. Examples of the composition for a skin include cosmetic materials such as foundation, body powder, and lipstick, hair cleaning materials such as shampoo and rinse, facial cleanser, and lotion. Examples of the composition for an oral cavity include dentifrice and tooth paste. Examples of composition for adsorbent include osteogenesis promoter.

EXAMPLES

Although the invention will be described in more detail using Examples, the invention is not limited to them. In the following description, common components are the same ones. The symbol "%" means "mass %" unless otherwise specified. Examples 1-6 are Inventive Examples, Examples 7-12 are Comparative Examples, and Example 13 is a Referential Example.

<Evaluation Methods>

Evaluations that were made of particles of Examples 1 to 13 will be described below.

Circularity

The circularity was measured by an image analysis using a flow-type particle image analyzing instrument "FPIA-3000S" (product name, produced by Sysmex Corporation). As for specific measurement conditions, a 20× high-magnification objective lens was used and the number of effective parses was set at 10,000.

Amount of Supported Hydroxyapatite

The amount of supported hydroxyapatite was measured by a high-frequency inductively coupled plasma atomic emission spectroscopy (ICP-AES) using an ICP emission analyzing instrument "ICPE-9000" (product name, produced by Shimadzu Corporation).

Average Particle Diameter ($D_{50}$) and $D_{90}/D_{10}$

The average particle diameter ($D_{50}$) and $D_{90}/D_{10}$ were measured by an electrical sensing zone method using a precision particle size distribution measuring instrument "Multisizer3" (product name, produced by Beckman Coulter, Inc.). As for the measurement conditions, in Examples 1-6, 8-11, and 13, the aperture diameter was 50

μm, the aperture current was 800, the gain was 4, and the number of particles measured was 50,000. In Example 7, the aperture diameter was 100 μm, the aperture current was 1,600, the gain was 2, and the number of particles measured was 30,000. In Example 12, the aperture diameter was 280 μm, the aperture current was 3,200, the gain was 1, and the number of particles measured was 30,000.

Specific Surface Area, Pore Volume, and Average Pore Diameter

The specific surface area, the pore volume, and the average pore diameter were determined by a BET method and a BJH method that are based on a nitrogen adsorption method using a specific surface area/pore distribution measuring instrument "BELSORP-miniII" (product name, produced by MicrotracBEL Corporation).

Crystallinity Index $C_{HAp}/C_{CeO2}$)

The ratio ($C_{HAp}/C_{CeO2}$) of $C_{HAp}$ to $C_{CeO2}$ was measured, in which the $C_{HAp}$ was a maximum count number in a range of 2θ=31.5° to 32.5° corresponding to the (211) plane of the hydroxyapatite in an XRD pattern of particles in each Example and the $C_{CeO2}$ was a maximum count number in a range of 2θ=28.0° to 29.0° corresponding to the (111) plane of the cerium oxide as an external standard in an XRD pattern. An X-ray diffraction instrument "D2 PHASER" (product name, produced by Bruker Corporation) was used for measurements.

More specifically, a glass sample stage having a 0.2-mm-deep groove filled with particles so as to have a flat surface was set in the X-ray diffraction instrument. A measurement was carried out with the following settings:
X-ray source: Cu;
X-ray output power: 300 W;
divergence slit: 1.0 mm;
air scattering screen: 3 mm;
Soller slit: 4°;
Ni filter: 0.25 mm;
detector: semiconductor detector "SSD160-2" (product name, produced by Bruker Corporation);
detector aperture width: 5.8°;
step width: 0.1°;
step time: 2 s; and
sample stage rotation speed: 10 rpm.
A maximum count in a range of 2θ=31.5° to 32.5° was employed as $C_{HAp}$. A measurement was carried out under the same conditions for cerium oxide ("CeO$_2$ Powder ca. 0.2 μm" produced by Kojundo Chemical Laboratory Co., Ltd., purity: 99.99% or higher, particle diameter: 0.2 μm) as an external standard, and a maximum count in a range of 2θ=28.0° to 29.0° was employed as $C_{CeO2}$. The ratio $C_{HAp}/C_{CeO2}$ was determined from the values of $C_{HAp}$ and $C_{CeO2}$ thus obtained.

Oil Absorption Value

The oil absorption value was measured according to JIS K 5101-13-1 (2004).

Surface SEM, Cross-Sectional SEM, and Cross-Sectional EDX)

The surface SEM was taken with an acceleration voltage of 1 kV and an emission current of 10 μA using a field emission-type scanning electron microscope "JSM-6701F" (produced by JEOL Ltd). A sample was fixed to a carbon tape and then coated with platinum (Pt).

The cross-sectional SEM was taken under the same conditions as the surface SEM. A sample was immersed in an epoxy resin precursor and subjected to solidification, a cross-section was cut out with a diamond knife, and a resulting sample was fixed to a carbon tape.

The cross-sectional EDX was taken with an acceleration voltage 15 kV, an emission current 10 μA, and an accumulation time 200 seconds using an energy dispersion-type X-ray analyzer "EDAX Genesis" (produced by AMETEK, Inc.) that is annexed to the above-mentioned SEM, and silicon elements, calcium elements, and phosphorus elements were analyzed.

Measurement of Intraparticle Uniformity of Hydroxyapatite

The intraparticle uniformity of hydroxyapatite was measured according to the following procedure.

When a unidirectional maximum particle diameter in a cross section of the hydroxyapatite-supporting porous silica particle was radially divided into a first portion to a third portion of three equal parts in an cross sectional image of the hydroxyapatite-supporting porous silica particle observed by the above SEM-EDX, a point analysis was performed under the same conditions as mentioned above using the energy dispersion-type X-ray analyzer at a total of six points, that is, three points that were selected arbitrarily from a range of a circle having, as a diameter, a diameter length of the second portion located at the center and three points that were selected arbitrarily from a range of a circle having, as a diameter, a diameter length of the first or third portion.

The peak signal intensity of each of silicon, phosphorus, and calcium was obtained on the basis of results of the above analyses. Then the peak signal intensity of calcium to that of silicon, the peak signal intensity of phosphorus to that of silicon, and the peak signal intensity of calcium to that of phosphorus were calculated, and a variation coefficient of the six points was calculated for each kind of peak signal intensity ratio.

The above series of variation coefficient calculations were performed on randomly selected three particles, and an average value of each kind of variation coefficient was calculated and employed as an average value of an intraparticle variation coefficient. These values being close to 0% means that the intraparticle uniformity of hydroxyapatite is high.

Measurement of Interparticle Uniformity of Hydroxyapatite

The interparticle uniformity of hydroxyapatite was measured according to the following procedure.

When a unidirectional maximum particle diameter in a cross section of the hydroxyapatite-supporting porous silica particle was radially divided into a first portion to a third portion of three equal parts in an cross sectional image of the hydroxyapatite-supporting porous silica particle observed by the SEM-EDX, a point analysis was performed under the same conditions as mentioned above using the energy dispersion-type X-ray analyzer at a total of six points, that is, three points that were selected arbitrarily from a range of a circle having, as a diameter, a diameter length of the second portion located at the center and three points that were selected arbitrarily from a range of a circle having, as a diameter, a diameter length of the first or third portion.

The peak signal intensity of each of silicon, phosphorus, and calcium was obtained on the basis of results of the above analyses. Then the peak signal intensity of calcium to that of silicon, the peak signal intensity of phosphorus to that of silicon, and the peak signal intensity of calcium to that of phosphorus were calculated, and an average value of the six points was calculated for each kind of peak signal intensity ratio.

The above series of average calculations were performed on randomly selected three particles, and a variation coefficient of each average value was calculated and employed as an interparticle variation coefficient. These values being close to 0% means that the interparticle uniformity of hydroxyapatite is high.

Oleic Acid Adsorption Amount

The oleic acid adsorption amount was determined by converting the result of the acid value measurement using the ethanolic potassium hydroxide solution.

Imitation sebum solutions 1-4 shown in the following Table 1 were used as an imitation sebum solution.

0.5 g of particles of each Example and 5 g of an imitation sebum solution were mixed with each other. After a mixed liquid was stirred for 48 hours, it was centrifuged at 1,260 G (relative centrifugal acceleration, ×g) for 10 minutes and a 2.5 g of supernatant was obtained. 25 mL of an organic solvent having ethanol:THF=1:2 and a proper amount of an ethanolic phenolphthalein were added to this supernatant, and the resulting solution was made a titration target. 200 mmol/L of an ethanolic potassium hydroxide solution whose titer had been determined in advance was used as a titration liquid, and a time point when it turned reddish purple was employed as an end point. The titer of the titration liquid was determined in advance from an amount that was required for neutralization of 200 mmol/L of hydrochloric acid.

The oleic acid adsorption amount was determined according to the following Expression (1). It is noted that a test that was conducted according to the above procedure using only an imitation sebum solution without mixing the particles in it was employed as a comparison test.

[Formula 3]

$$\text{Oleic acid adsorption amount (mg/g)} = \text{acid value reduction (mg/g)} \times \frac{\text{oleic acid molecular weight (g/mol)}}{\text{potassium hydroxide molecular weight (g/mol)}} \times \frac{\text{imitation sebum solution weight (g)}}{\text{sample weight (g)}} \quad (1)$$

In the above Expression (1), the acid value reduction (mg/g) was determined in the following manner:

[Formula 4]

$$\text{Acid value reduction (mg/g)} = \text{acid value of comparison test (mg/g)} - \text{acid value of each test (mg/g)}$$

$$\text{Acid value (mg/g)} = \frac{\text{titration volume (mL)} \times \text{titer (-)} \times (200 \times 10^{-3})\,(\text{mol/L}) \times \text{potassium hydroxide molecular weight (g/mol)}}{\text{supernatant weight (g)}}$$

TABLE 1

| | | (Blending amount: %) | | | |
|---|---|---|---|---|---|
| Component name | Product name | Imitation sebum solution 1 Oleic acid concentration: 0.1 mass % | Imitation sebum solution 2 Oleic acid concentration: 1 mass % | Imitation sebum solution 3 Oleic acid concentration: 16 mass % | Imitation sebum solution 4 Oleic acid concentration: 50 mass % |
| caprylic/capric triglyceride | O.D.O (produced by The Nisshin OilliO Group, Ltd.) | 51.1 | 50.7 | 43.0 | 25.6 |
| octyldodecyl myristate | Exceparl OD-M (produced by Kao Chemicals) | 34.6 | 34.2 | 29.0 | 17.3 |
| squalane | Phytosqualan (produced by SOPHIM) | 14.2 | 14.1 | 12.0 | 7.1 |

TABLE 1-continued

|  |  | (Blending amount: %) | | | |
| --- | --- | --- | --- | --- | --- |
| Component name | Product name | Imitation sebum solution 1 Oleic acid concentration: 0.1 mass % | Imitation sebum solution 2 Oleic acid concentration: 1 mass % | Imitation sebum solution 3 Oleic acid concentration: 16 mass % | Imitation sebum solution 4 Oleic acid concentration: 50 mass % |
| oleic acid | Lunac O-V (produced by Kao Chemicals) | 0.1 | 1.0 | 16.0 | 50.0 |

Dynamic Friction Coefficient, Standard Deviation of Dynamic Friction Coefficients, and Static Friction Coefficient The friction coefficients were measured using a static/dynamic friction measuring instrument "TL201Ts" (product name, produced by Trinity-Lab. Inc.). The friction coefficients were measured using a urethane artificial finger as a contactor with load of 30 gf, scanning distance of 40 mm, and scanning speed of 10 mm/s, using an artificial leather "Sapplare" (produced by Idemitsu Technofine Co., Ltd.) as a coating target substrate, and setting a sticking amount of particles of each Examples in terms of bulk volume per unit area at 0.03 µL/mm$^2$. An average value in a range of from 300 msec to 4,000 msec among the friction coefficients obtained was employed as the dynamic friction coefficient and a standard deviation obtained in the above range was employed as the standard deviation of dynamic friction coefficients.

The static friction coefficient was determined from a maximum value in a range of from 0 msec to 300 msec.

Haze

The haze was determined using a haze meter "NDH-7000" (produced by Nippon Denshoku Industries Co., Ltd.). 0.02 g of particles of each Example and 0.38 g of the above-mentioned imitation sebum solution were weighed out and mixed, and then particles were dispersed well using BioMasher II (produced by Nippi, Inc.). A measurement sample was obtained by sandwiching the resulting dispersion between quartz plates with attention paid so that no air bubbles ware entered. In doing so, a 30 µm thick mending tape (produced by 3M Company) was used as a spacer.

PSF Half Width

The PSF half width was measured according to the following procedure. The measurement sample that was used for the above-described haze measurement was put on a glass plate, a digital camera "STYLUS TG-4" (product name, produced by Olympus Corporation) was set so as to be distant from the surface of the measurement sample by 3.0 cm, an ISO resolution test chart No. 2 was set as a background so as to be distant from the back surface of the measurement sample by 1.0 cm, and an image was obtained by shooting the background via the measurement sample. The PSF (point spread function) image was obtained by performing blind deconvolution on this image using image analysis software "AutoQuantX3" (product name, produced by Media Cybernetics, Inc.). The line profile was acquired along a 45° slant line that passed the center of the thus-obtained PSF image and its half width was employed as the PSF half width.

Sensory Tests

1. Evaluation of a Slippery Sense

Among sensory tests, the slippery sense was measured according to the following procedure. A proper amount of particles (a half amount in a microspatula) was applied to the inside of an upper arm, the tactile sense was checked by a fingertip, and the degree of slippery sense was evaluated using the following four levels. In the following evaluation levels, A and B are acceptable and C and D are unacceptable.
Evaluation criteria:
  A: High in slippery sense
  B: Medium in slippery sense
  C: Low in slippery sense
  D: No slippery sense 2. Evaluation of a Smooth Feel Among the sensory tests, the smooth feel was measured according to the following procedure. A proper amount of particles (a half amount in a microspatula) was applied to the inside of an upper arm, the tactile sense was checked by a fingertip, and the smooth feel was evaluated using the following four levels. In the following evaluation levels, A and B are acceptable and C and D are unacceptable.
Evaluation criteria:
  A: High in smooth feel
  B: Medium in smooth feel
  C: Low in smooth feel
  D: No smooth feel Example 1

The truly spherical porous silica particles "H-52" (produced by AGC Si-Tech Co., Ltd., circularity: 0.958, average particle diameter (in terms of volume basis, this also applies to the following description): 5.0 µm, specific surface area: 652 m$^2$/g, pore volume: 1.59 mL/g, average pore diameter: 9.8 nm, oil absorption value: 324 mL/100 g) were weighed out so as to be 30.0 g. Then the first solution was prepared by mixing together 8.9 g of calcium hydroxide (produced by Kanto Chemical Co., Inc.) and 200 g of water. These were put into a glass beaker having a capacity of 300 mL (Ca/Si (mole ratio)=0.24) and were caused to react with each other at room temperature for 7 hours while being stirred at 250 rpm using an overhead stirrer. The resulting solution was then filtered using filter paper No. 5A for quantitative analysis (produced by ADVANTEC Co., Ltd.), cleaned using 600 mL of water, and subjected to replacement using 200 mL of isopropyl alcohol (produced by Kanto Chemical Co., Inc.). The wet cake thus obtained was dried at 70° C.

for 6 hours and at 180° C. for 12 hours, thereby obtaining 36.2 g of the calcium-fixed porous silica particles.

All of the calcium-fixed porous silica particles were stirred using "LAB. MIXER" (produced by HANIL ELECTRIC Co., Ltd.), and 39.9 mL of the aqueous solution (second solution) of phosphoric acid (produced by Kanto Chemical Co., Inc.) prepared in advance so as to have a concentration of 17.5 g/100 mL was added to the calcium-fixed porous silica particles being stirred. The addition was made using a spray nozzle and took 2 minutes. The resulting solution was then filtered using filter paper No. 5A for quantitative analysis (produced by ADVANTEC Co., Ltd.), cleaned using 1,300 mL of water, and subjected to replacement using 200 mL of isopropyl alcohol (produced by Kanto Chemical Co., Inc.). The wet cake thus obtained was dried at 70° C. for 6 hours and at 180° C. for 12 hours, thereby obtaining 36.3 g of the hydroxyapatite-supporting porous silica particles.

Figure 2:
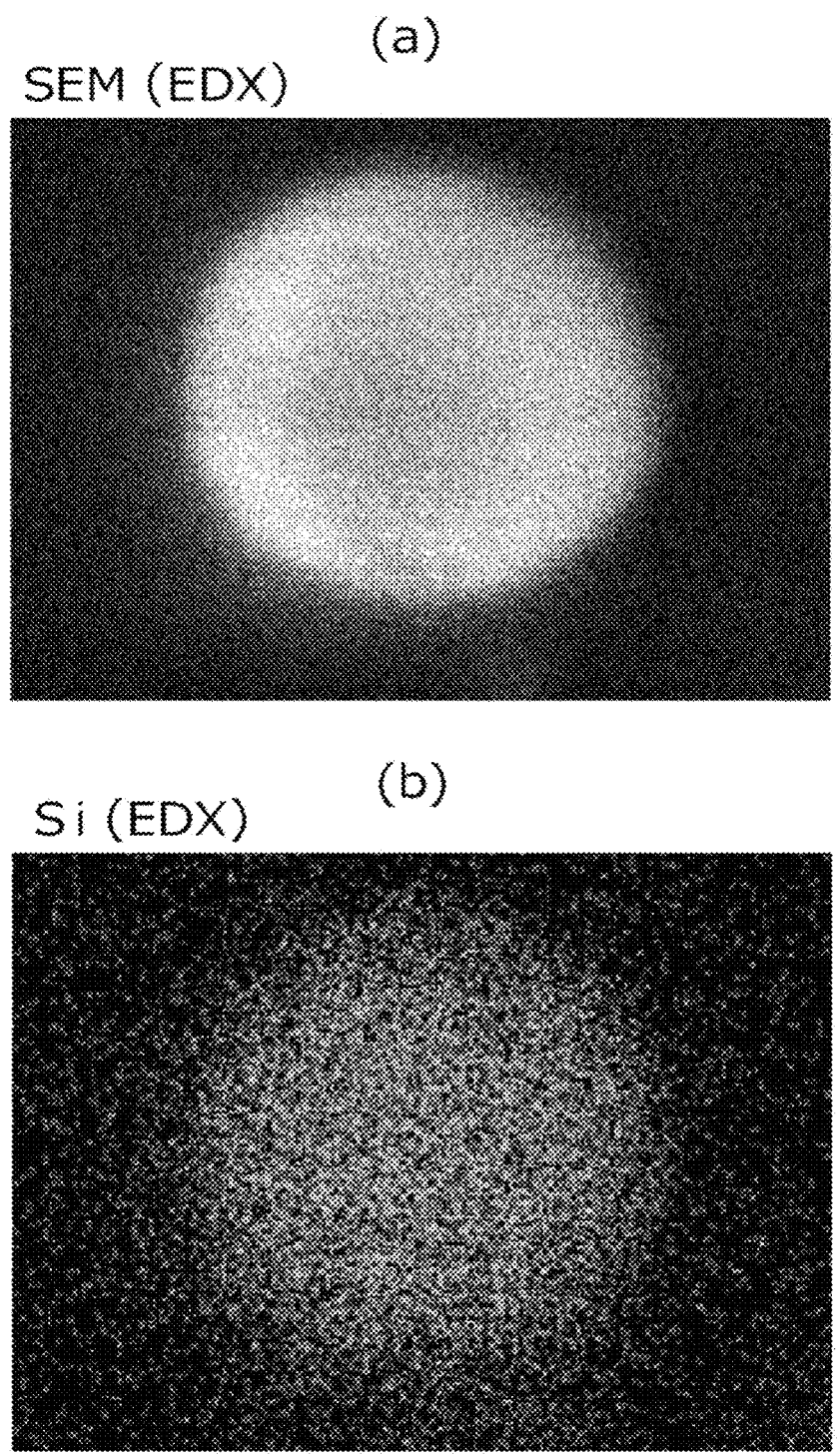
FIG. 2 includes energy dispersion-type X-ray analysis photographs (EDX images) of a hydroxyapatite-supporting porous silica particle obtained in Example 1; (a) is a cross-sectional SEM image of a particle that was subjected to EDX shooting and (b) is a cross-sectional EDX image of silica (Si).
Figure 3:
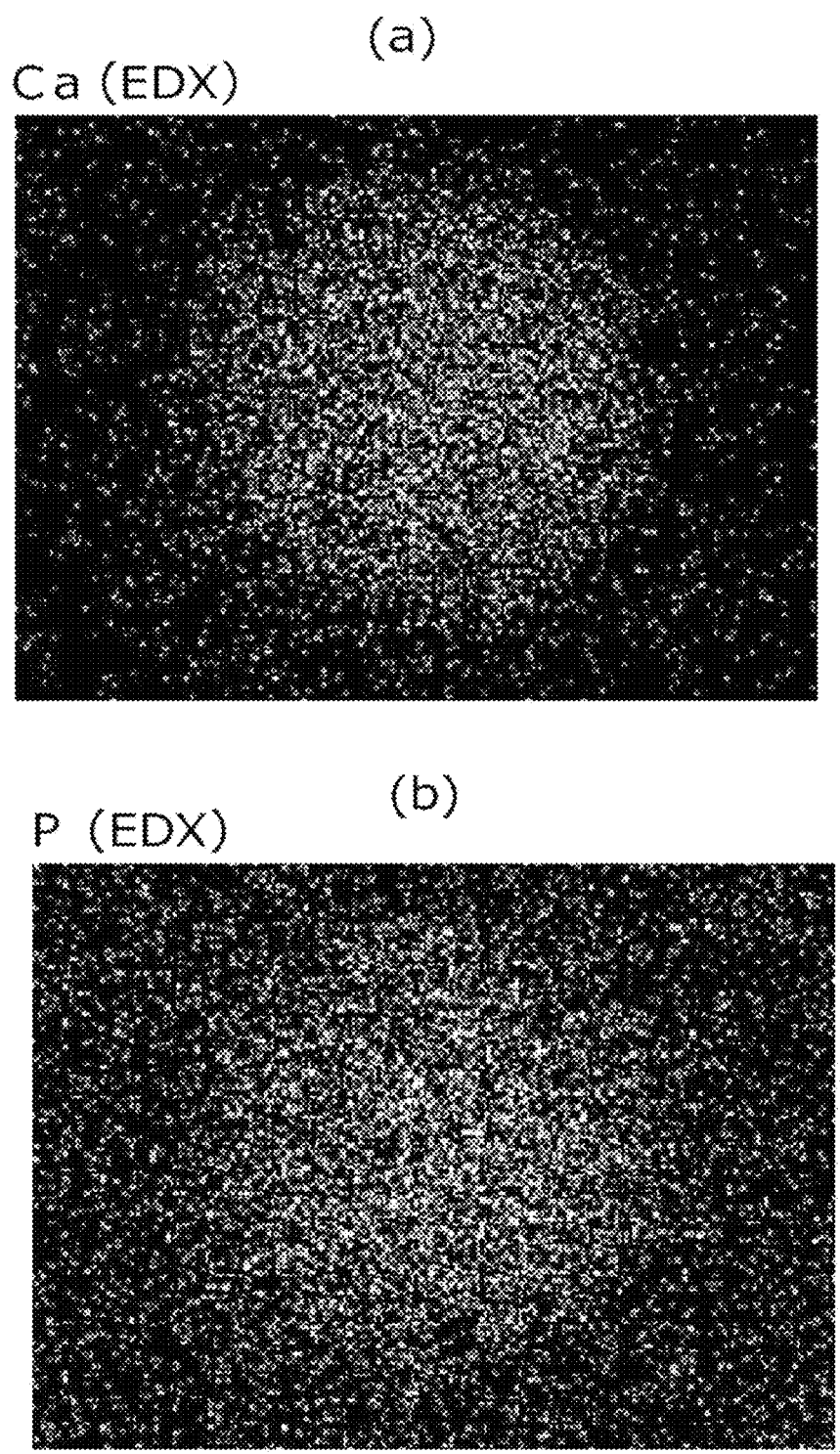
FIG. 3 includes energy dispersion-type X-ray analysis photographs (EDX images) of a hydroxyapatite-supporting porous silica particle obtained in Example 1; (a) is a cross-sectional EDX image of calcium (Ca) and (b) is a cross-sectional EDX image of phosphorus (P).

The surface SEM image, the cross-sectional SEM image, and the cross-sectional EDX image of the thus-obtained hydroxyapatite-supporting porous silica particle were taken. Results are shown in FIGS. 1-3. (a) of FIG. 1 shows a surface SEM image of the hydroxyapatite-supporting porous silica particle and (b) of FIG. 1 shows its cross-sectional SEM image. (a) of FIG. 2 shows a cross-sectional SEM image of the particle that was subjected to EDX shooting and (b) of FIG. 2 shows a cross-sectional EDX image of silica (Si). (a) of FIG. 3 shows a cross-sectional EDX image of calcium (Ca) and (b) of FIG. 3 shows a cross-sectional EDX image of phosphorus (P).

It was seen from (a) and (b) of FIG. 1 that the hydroxyapatite-supporting porous silica particle was an almost truly spherical particle. It was seen from (a) of FIG. 2 that the hydroxyapatite-supporting porous silica particle was EDX-analyzed properly, and it was seen from (b) of FIG. 2 that a silica porous framework structure was formed inside the particle. It was seen from (a) of FIG. 3 that calcium (Ca) was distributed uniformly inside the particle, and it is seen from (b) of FIG. 3 that phosphorus (P) was distributed uniformly inside the particle. It was found from FIGS. 2 and 3 that hydroxyapatite was distributed uniformly also inside the particle.

Example 2

28.2 g of the hydroxyapatite-supporting porous silica particles were obtained in the same manner as in Example 1 except that 3.0 g of calcium hydroxide was used and Ca/Si (mole ratio) was set at 0.08.

Example 3

55.1 g of the hydroxyapatite-supporting porous silica particles were obtained in the same manner as in Example 1 except that 23.7 g of calcium hydroxide was used and Ca/Si (mole ratio) was set at 0.64.

Example 4

50.0 g of the truly spherical porous silica particles "H-52" (produced by AGC Si-Tech Co., Ltd., circularity: 0.958, average particle diameter: 5.0 µm, specific surface area: 652 m$^2$/g, pore volume: 1.59 mL/g, average pore diameter: 9.8 nm, oil absorption value: 324 mL/100 g) were stirred using a LAB. MIXER (produced by HANIL ELECTRIC Co., Ltd.). 62.2 mL of the aqueous solution (first solution) of calcium chloride (produced by Kanto Chemical Co., Inc.) that had been prepared so as to have a concentration of 56.3 g/100 mL was added to the porous silica particles being stirred. The addition was made using a spray nozzle and took 2 minutes. Then the solution was dried at 70° C. for 6 hours, thereby obtaining the calcium-fixed porous silica particles.

All of the calcium-fixed porous silica particles were stirred using "LAB. MIXER," and a mixed liquid of 36.6 mL of the aqueous solution (second solution) of dipotassium hydrogen phosphate (produced by Kanto Chemical Co., Inc.) prepared in advance so as to have a concentration of 90.0 g/100 mL and 56.7 mL of the aqueous solution (pH adjuster) of potassium hydroxide (produced by Kanto Chemical Co., Inc.) prepared in advance so as to have a concentration of 85.0 g/100 mL was added to the calcium-fixed porous silica particles being stirred. The addition was made using a spray nozzle and took 2 minutes. The resulting solution was then filtered using filter paper No. 5A for quantitative analysis (produced by ADVANTEC Co., Ltd.), cleaned using 2,200 mL of water, and subjected to replacement using 350 mL of isopropyl alcohol (produced by Kanto Chemical Co., Inc.). The wet cake thus obtained was dried at 70° C. for 6 hours and at 180° C. for 12 hours, thereby obtaining 73.1 g of the hydroxyapatite-supporting porous silica particles.

Example 5

100 g of the truly spherical porous silica particles "H-52" (produced by AGC Si-Tech Co., Ltd., circularity: 0.958, average particle diameter: 5.0 µm, specific surface area: 652 m$^2$/g, pore volume: 1.59 mL/g, average pore diameter: 9.8 nm, oil absorption value: 324 mL/100 g) were weighed out. Then the first solution was prepared by mixing together 84.5 g of calcium hydroxide (produced by Kanto Chemical Co., Inc.) and 1,447 g of water. These were put into a glass beaker having a capacity of 3 L (Ca/Si (mole ratio)=0.69) and were caused to react with each other at room temperature for 7 hours while being stirred at 250 rpm using an overhead stirrer.

Then 183 mL of the aqueous solution (second solution) of phosphoric acid (produced by Kanto Chemical Co., Inc.) that had been prepared in advance so as to have a concentration of 29.6 g/100 mL was added. The addition was made using a roller pump and took 22 minutes. After completion of the addition, the mixing was continued for 10 minutes in the same manner, thereby obtaining 1,842 g of the hydroxyapatite-supporting porous silica particle slurry. The slurry thus obtained was dried quickly using a spray dryer, thereby obtaining 193 g of the hydroxyapatite-supporting porous silica particles.

Example 6

250 g of the truly spherical porous silica particles "H-52" (produced by AGC Si-Tech Co., Ltd., circularity: 0.958, average particle diameter: 5.0 µm, specific surface area: 652 m$^2$/g, pore volume: 1.59 mL/g, average pore diameter: 9.8 nm, oil absorption value: 324 mL/100 g) were weighed out. Then the first solution was prepared by mixing together 126 g of calcium hydroxide (produced by Kanto Chemical Co., Inc.) and 3,443 g of water. These were put into a PE container having a capacity of 10 L (Ca/Si (mole ratio) =0.43) and were caused to react with each other at 50° C. for 2.5 hours while being stirred at 250 rpm using an overhead stirrer.

Then 294 mL of the aqueous solution (second solution) of phosphoric acid (produced by Kanto Chemical Co., Inc.)

that had been prepared in advance so as to have a concentration of 29.6 g/100 mL was added. The addition was made using a roller pump and took 14 minutes. After the completion of the addition, the mixing was continued for 10 minutes in the same manner, thereby obtaining 4,157 g of the hydroxyapatite-supporting porous silica particle slurry. The slurry thus obtained was dried quickly using a spray dryer, thereby obtaining 391 g of the hydroxyapatite-supporting porous silica particles.

Example 7

The hydroxyapatite "Spherical HAP" (produced by Taihei Chemical Industrial Co., Ltd., circularity: 0.928, average particle diameter: 18.0 µm, specific surface area: 39 m²/g, pore volume: 0.32 mL/g, average pore diameter: 33 nm, oil absorption value: 148 mL/100 g) was used.

Example 8

The truly spherical porous silica particles "H-52" (produced by AGC Si-Tech Co., Ltd., circularity: 0.958, average particle diameter: 5.0 µm, specific surface area: 652 m²/g, pore volume: 1.59 mL/g, average pore diameter: 9.8 nm, oil absorption value: 324 mL/100 g) and the hydroxyapatite "Spherical HAP" (produced by Taihei Chemical Industrial Co., Ltd., circularity: 0.928, average particle diameter: 18.0 µm, specific surface area: 39 m²/g, pore volume: 0.32 mL/g, average pore diameter: 33 nm, oil absorption value: 148 mL/100 g) were mixed together at a mass ratio of (truly spherical porous silica particles):hydroxyapatite=60:40.

Example 9

This Example was conducted in the same manner as in Example 8 except that the mixing ratio was (truly spherical porous silica particles):hydroxyapatite=72:28.

Example 10

This Example was conducted in the same manner as in Example 8 except that the mixing ratio was (truly spherical porous silica particles):hydroxyapatite=88:12.

Example 11

The truly spherical porous silica particles "H-52" (produced by AGC Si-Tech Co., Ltd., circularity: 0.958, average particle diameter: 5.0 µm, specific surface area: 652 m²/g, pore volume: 1.59 mL/g, average pore diameter: 9.8 nm, oil absorption value: 324 mL/100 g) were used.

Example 12

15.0 g of the granular-type porous silica particles (circularity: 0.559, average particle diameter: 42.9 µm, specific surface area: 430 m²/g, pore volume: 0.76 mL/g, average pore diameter: 7.1 nm, oil absorption value: 149 mL/100 g) were weighed out. Then the first solution was prepared by mixing together 4.4 g of calcium hydroxide (produced by Kanto Chemical Co., Inc.) and 100 g of water. These were put into a glass beaker having a capacity of 200 mL (Ca/Si (mole ratio)=0.24) and were caused to react with each other at room temperature for 7 hours while being stirred at 250 rpm using an overhead stirrer. The resulting solution was then filtered using filter paper No. 5A for quantitative analysis (produced by ADVANTEC Co., Ltd.), cleaned using 300 mL of water, and subjected to replacement using 100 mL of isopropyl alcohol (produced by Kanto Chemical Co., Inc.). The wet cake thus obtained was dried at 70° C. for 6 hours and at 180° C. for 12 hours, thereby obtaining 19.3 g of the calcium-fixed-granular-type porous silica particles.

All of the calcium-fixed-granular-type porous silica particles were stirred using "LAB. MIXER" (produced by HANIL ELECTRIC Co., Ltd.), and 9.2 mL of the aqueous solution (second solution) of phosphoric acid (produced by Kanto Chemical Co., Inc.) prepared in advance so as to have a concentration of 37.3 g/100 mL was added to the calcium-fixed-granular-type porous silica particles being stirred. The addition was made using a spray nozzle and took 2 minutes. The resulting solution was then filtered using filter paper No. 5A for quantitative analysis (produced by ADVANTEC Co., Ltd.), cleaned using 650 mL of water, and subjected to replacement using 100 mL of isopropyl alcohol (produced by Kanto Chemical Co., Inc.). The wet cake thus obtained was dried at 70° C. for 6 hours and at 180° C. for 12 hours, thereby obtaining 19.7 g of the hydroxyapatite-supporting porous silica particles.

Example 13

Polyurethane particles "C-800 transparent" (produced by Negami Chemical Industrial Co., Ltd., circularity: 0.964, particle diameter: 8.1 µm, oil absorption value: 63 mL/100 g) were used.

The particles of Examples 1-13 were subjected to measurement of the circularity, the amount of supported hydroxyapatite, the average particle diameter ($D_{50}$), $D_{90}/D_{10}$, the specific surface area, the pore volume, the average pore diameter, $C_{HAp}/C_{CeO2}$, the oil absorption value, the intraparticle uniformity of hydroxyapatite, the interparticle uniformity of hydroxyapatite, the oleic acid adsorption amount, the dynamic friction coefficient, the standard deviation of dynamic friction coefficients, the static friction coefficient, the haze, and the PSF half width as well as sensory tests. Results are shown in Tables 2 and 3.

TABLE 2

| | Amount of supported hydroxyapatite wt % | Circularity | Average value of intraparticle variation coefficient | | | Interparticle variation coefficient | | | Particle size distribution | | Physical properties of pores | | $C_{HAp}/C_{CeO2}$ |
|---|---|---|---|---|---|---|---|---|---|---|---|---|---|
| | | | Ca/Si % | P/Si % | Ca/P % | Ca/Si % | P/Si % | Ca/P % | $D_{50}$ µm | $D_{90}/D_{10}$ | Specific surface area m²/g | Pore volume mL/g | |
| Example 1 | 28 | 0.945 | 15 | 8 | 13 | 29 | 29 | 6 | 4.9 | 2.7 | 270 | 0.93 | 0.24 |
| Example 2 | 12 | 0.965 | 15 | 19 | 19 | 36 | 36 | 5 | 5.0 | 2.7 | 308 | 1.24 | 0.20 |

TABLE 2-continued

| | Amount of supported hydroxyapatite wt % | Circularity — | Average value of intraparticle variation coefficient | | | Interparticle variation coefficient | | | Particle size distribution | | Physical properties of pores | | |
|---|---|---|---|---|---|---|---|---|---|---|---|---|---|
| | | | Ca/Si % | P/Si % | Ca/P % | Ca/Si % | P/Si % | Ca/P % | $D_{50}$ μm | $D_{90}/D_{10}$ — | Specific surface area m2/g | Pore volume mL/g | $C_{HAp}/C_{CeO2}$ — |
| Example 3 | 50 | 0.823 | 10 | 17 | 19 | 28 | 18 | 29 | 6.7 | 5.4 | 185 | 0.56 | 0.24 |
| Example 4 | 40 | 0.896 | 11 | 8 | 6 | 29 | 15 | 22 | 5.6 | 5.3 | 201 | 0.72 | 0.40 |
| Example 5 | 47 | 0.910 | 19 | 34 | 22 | 18 | 19 | 21 | 5.2 | 4.1 | 160 | 0.92 | 0.18 |
| Example 6 | 36 | 0.841 | 27 | 30 | 14 | 6 | 4 | 4 | 5.3 | 2.4 | 171 | 1.14 | 0.21 |
| Example 7 | 100 | 0.928 | N/A | N/A | N/A | N/A | N/A | N/A | 18.0 | 3.2 | 39 | 0.32 | 1.11 |
| Example 8 | — | — | N/A | N/A | N/A | N/A | N/A | N/A | — | — | — | — | — |
| Example 9 | — | — | N/A | N/A | N/A | N/A | N/A | N/A | — | — | — | — | — |
| Example 10 | — | — | N/A | N/A | N/A | N/A | N/A | N/A | — | — | — | — | — |
| Example 11 | — | 0.958 | N/A | N/A | N/A | N/A | N/A | N/A | 5.0 | 2.7 | 652 | 1.59 | 0.20 |
| Example 12 | 24 | 0.754 | 14 | 14 | 12 | 24 | 32 | 9 | 32.8 | 1.9 | 295 | 0.44 | 0.17 |
| Example 13 | — | 0.964 | N/A | N/A | N/A | N/A | N/A | N/A | 8.1 | 2.4 | — | — | — |

N/A: Cannot be calculated because no peak of Ca, P, or Si was detected.

TABLE 3

| | Oil absorption value mL/100 g | Oleic acid adsorption amount | | | | Friction coefficient | | | Optical characteristics | | Sensory tests | |
|---|---|---|---|---|---|---|---|---|---|---|---|---|
| | | Imitation sebum solution 1 Oleic acid concentration: 0.1 mass % mg/g | Imitation sebum solution 2 Oleic acid concentration: 1 mass % mg/g | Imitation sebum solution 3 Oleic acid concentration: 16 mass % mg/g | Imitation sebum solution 4 Oleic acid concentration: 50 mass % mg/g | Dynamic friction coefficient — | Static friction coefficient — | Standard deviation of dynamic friction coefficients — | Haze % | PSF half width μm | Slippery sense — | Smooth feel — |
| Example 1 | 204 | 14 | 78 | 174 | 233 | 0.24 | 0.47 | 0.021 | 13 | 1.4 | A | A |
| Example 2 | 230 | 12 | 31 | 73 | 99 | 0.15 | 0.45 | 0.009 | 2 | 1.2 | A | A |
| Example 3 | 142 | 8 | 98 | 546 | 534 | 0.25 | 0.49 | 0.026 | 28 | 1.6 | A | B |
| Example 4 | 158 | 13 | 40 | 76 | 100 | 0.23 | 0.45 | 0.026 | 29 | 1.9 | A | B |
| Example 5 | 220 | 10 | 99 | 834 | 664 | 0.20 | 0.46 | 0.009 | 24.4 | 1.9 | A | A |
| Example 6 | 278 | 10 | 106 | 523 | 457 | 0.16 | 0.42 | 0.011 | 12.3 | 1.5 | A | A |
| Example. 7 | 148 | 11 | 25 | 56 | 79 | 0.76 | 0.82 | 0.036 | 27 | 1.5 | D | C |
| Example 8 | — | 13 | 19 | 35 | 66 | — | — | — | — | — | D | C |
| Example 9 | — | 6 | 16 | 53 | 66 | — | — | — | — | — | C | C |
| Example 10 | — | 5 | 11 | 51 | 47 | — | — | — | — | — | A | C |
| Example 11 | 324 | 2 | 10 | 22 | 29 | 0.39 | 0.47 | 0.045 | 1 | 1.1 | A | C |

TABLE 3-continued

| | | Oleic acid adsorption amount | | | | Friction coefficient | | | Optical characteristics | | Sensory tests | |
|---|---|---|---|---|---|---|---|---|---|---|---|---|
| | | Imitation sebum solution 1 Oleic acid | Imitation sebum solution 2 Oleic acid | Imitation sebum solution 3 Oleic acid | Imitation sebum solution 4 Oleic acid | Dynamic | Static | Standard deviation of | | PSF | | |
| | Oil absorption value mL/100 g | concentration: 0.1 mass % mg/g | concentration: 1 mass % mg/g | concentration: 16 mass % mg/g | concentration: 50 mass % mg/g | friction coefficient — | friction coefficient — | dynamic friction coefficients — | Haze % | half width μm | Slippery sense — | Smooth feel — |
| Example 12 | 114 | 10 | 92 | 411 | 435 | 0.96 | 1.64 | 0.059 | 14 | 1.5 | D | D |
| Example 13 | 63 | 1 | 5 | 26 | 31 | 024 | 0.47 | 0.023 | 29 | 2.5 | A | A |

From the results shown in Tables 2 and 3, in Examples 1-6, the dynamic friction coefficient, the static friction coefficient, and the standard deviation of dynamic friction coefficients are equivalent to those in Example 13 (polyurethane particles) and hence it has been found that the slippery sense and the smooth feel are obtained. Furthermore, the oleic acid adsorption amounts are much larger than in Examples 8-11 and 13. Thus, it has been found that in use in, for example, a cosmetic material, free fatty acid that is secreted from sebum is adsorbed and hence an effect (skin care effect) of suppressing formation of pimples can be expected. Still further, since the haze and the PSF half width are larger than in Example 11 in which only silica particles were used, it has been found that the refractive index is high and a superior soft focusing effect can be exhibited in use as part of a cosmetic material.

Although the invention has been described in detail by referring to the particular embodiment, it is apparent to those skilled in the art that various changes and modifications are possible without departing from the spirit and scope of the invention. The present application is based on Japanese Patent Application No. 2020-073063 filed on Apr. 15, 2020, the disclosure of which is incorporated herein by reference.

The invention claimed is:

1. Hydroxyapatite-supporting porous silica particles,
    wherein hydroxyapatite is supported on a surface of a spherical porous silica particle and inner surfaces of pores of the spherical porous silica particle,
    wherein the hydroxyapatite-supporting porous silica particle has a circularity of 0.760 or larger, and
    wherein the hydroxyapatite-supporting porous silica particles have an average particle diameter $D_{50}$ in a volume basis cumulative particle size distribution of from 2 μm to 500 μm.

2. The hydroxyapatite-supporting porous silica particles according to claim 1,
    wherein an amount of the supported hydroxyapatite is from 0.1 mass % to 80 mass % in the hydroxyapatite-supporting porous silica particles.

3. The hydroxyapatite-supporting porous silica particles according to claim 1, having a ratio ($C_{HAp}/C_{CeO2}$) of $C_{HAp}$ to $C_{CeO2}$ of 1.0 or smaller,
    wherein the $C_{HAp}$ is a maximum count number in a range of 2θ=31.5° to 32.5° corresponding to a (211) plane of the hydroxyapatite in an XRD pattern of the hydroxyapatite-supporting porous silica particles and the $C_{CeO2}$ is a maximum count number in a range of 2θ=28.0° to 29.0° corresponding to a (111) plane of a cerium oxide in a separately measured XRD pattern of cerium oxide as an external standard.

4. The hydroxyapatite-supporting porous silica particles according to claim 1, satisfying the following conditions (1)-(3),
    wherein when a unidirectional maximum particle diameter in a cross section of a hydroxyapatite-supporting porous silica particle is radially divided into a first portion, a second portion, and a third portion of three equal parts in a cross sectional image of the hydroxyapatite-supporting porous silica particle observed by SEM-EDX, a point analysis is performed at three points that are selected arbitrarily from a range of a circle having, as a diameter, a diameter length of the second portion located at the center and at three points that are selected arbitrarily from a range of a circle having, as a diameter, a diameter length of the first or third portion:
    (1) an average value of an intraparticle variation coefficient of a peak signal intensity of calcium to a peak signal intensity of silicon is from 0% to 50%;
    (2) an average value of an intraparticle variation coefficient of a peak signal intensity of phosphorus to a peak signal intensity of silicon is from 0% to 50%; and
    (3) an average value of an intraparticle variation coefficient of a peak signal intensity of calcium to a peak signal intensity of phosphorus is from 0% to 50%.

5. The hydroxyapatite-supporting porous silica particles according to claim 1, having a pore volume of from 0.05 mL/g to 2.50 mL/g.

6. The hydroxyapatite-supporting porous silica particles according to claim 1,
    wherein the hydroxyapatite-supporting porous silica particles have an oleic acid adsorption amount of 60 mg/g or higher when 0.5 g of the hydroxyapatite-supporting porous silica particles are mixed with 5 g of an imitation sebum solution containing oleic acid at a concentration of 16 mass %.

7. A method for producing the hydroxyapatite-supporting porous silica particles according to claim 1,
    wherein hydroxyapatite is produced by bringing a calcium source and a phosphorus source into contact with spherical porous silica particles each having a circularity of 0.560 or higher.

8. The method for producing the hydroxyapatite-supporting porous silica particles according to claim 7, the method comprising:

fixing calcium on the surfaces of the spherical porous silica particles and the inner surfaces of pores of the spherical porous silica particles by bringing a first solution containing the calcium source into contact with the spherical porous silica particles; and producing hydroxyapatite by reacting the calcium with phosphorus by bringing a second solution containing the phosphorus source into contact with the calcium-fixed spherical porous silica particles.

9. A composition for a skin, a composition for an oral cavity, a composition for an adsorbent, or a medicine composition containing the hydroxyapatite-supporting porous silica particles according to claim 1.

* * * * *